(12) United States Patent
Cleland

(10) Patent No.: US 9,089,958 B2
(45) Date of Patent: Jul. 28, 2015

(54) MULTI-FUNCTIONAL TOOL FOR FLEXIBLE PIPE AND RELATED METHODS

(75) Inventor: John G. Cleland, Cary, NC (US)

(73) Assignee: MIL3 INC., Cary, NC (US)

( * ) Notice: Subject to any disclaimer, the term of this patent is extended or adjusted under 35 U.S.C. 154(b) by 299 days.

(21) Appl. No.: 13/540,110

(22) Filed: Jul. 2, 2012

(65) Prior Publication Data

US 2013/0000051 A1    Jan. 3, 2013

Related U.S. Application Data

(60) Provisional application No. 61/503,788, filed on Jul. 1, 2011.

(51) Int. Cl.
| | | |
|---|---|---|
| *B25B 27/00* | (2006.01) | |
| *B25F 1/00* | (2006.01) | |
| *B25B 27/14* | (2006.01) | |
| *B23D 21/02* | (2006.01) | |
| *B26D 3/16* | (2006.01) | |
| *B25B 27/10* | (2006.01) | |
| *B26D 3/00* | (2006.01) | |

(52) U.S. Cl.
CPC .............. *B25B 27/146* (2013.01); *B23D 21/02* (2013.01); *B25B 27/10* (2013.01); *B25F 1/003* (2013.01); *B26D 3/169* (2013.01); *B26D 3/001* (2013.01)

(58) Field of Classification Search
CPC .............. B25B 7/02; B25B 7/20; B25B 7/22; B25B 25/005; B25B 27/10; B25B 27/14; B25B 27/146; H01R 43/027; H01R 43/042; H01R 43/0421; B26D 3/169; B25F 1/003
USPC ............ 81/9.3, 342, 348, 350, 367, 376, 379, 81/383, 487; 72/409.01, 409.07–409.09, 72/409.1, 409.11, 409.12, 409.19
See application file for complete search history.

(56) References Cited

U.S. PATENT DOCUMENTS

| | | | | |
|---|---|---|---|---|
| 300,717 | A | * | 6/1884 | Merrick .................... 81/DIG. 5 |
| 542,035 | A | | 7/1895 | Willever |
| 1,910,838 | A | | 5/1933 | Jenson |
| 2,503,783 | A | | 4/1950 | Ward et al. |
| 2,532,659 | A | | 12/1950 | Burns |
| 2,556,725 | A | | 6/1951 | Hurlbut |
| 2,908,114 | A | | 10/1959 | Fouse |
| 2,994,238 | A | | 8/1961 | Matthysse |
| 3,170,345 | A | | 2/1965 | Poiongt |
| 3,277,751 | A | | 10/1966 | Filia |
| 3,393,438 | A | | 7/1968 | Marley et al. |
| 3,481,373 | A | | 12/1969 | Blagojevich |
| 3,487,524 | A | | 1/1970 | Filia |
| 3,523,351 | A | | 8/1970 | Filia |

(Continued)

FOREIGN PATENT DOCUMENTS

GB    1 522 144    8/1978

*Primary Examiner* — Hadi Shakeri
(74) *Attorney, Agent, or Firm* — Myers Bigel Sibley & Sajovec, PA

(57) ABSTRACT

A multifunctional tool includes first and second handle members, first and second jaw members operatively connected to the first and second handle members and movable between a first open position and a second closed position, and first and second removable collar attachment members configured to be removably installed in the first and second jaw members, respectively, to provide different sizes of compressing and/or cutting diameters when the first and second jaw members are in the second closed position.

23 Claims, 15 Drawing Sheets

(56) References Cited

U.S. PATENT DOCUMENTS

| | | |
|---|---|---|
| 3,600,979 A | 8/1971 | Rozmus |
| 3,837,211 A | 9/1974 | Gress et al. |
| 4,005,516 A | 2/1977 | Bakermans |
| 4,040,179 A | 8/1977 | Sanchez |
| 4,170,154 A | 10/1979 | Izraeli |
| 4,286,372 A | 9/1981 | Batcheller |
| 4,611,511 A | 9/1986 | Mykkanen |
| 4,735,442 A | 4/1988 | Burli |
| 2,988,941 A | 6/1991 | Ortman |
| 5,267,464 A | 12/1993 | Cleland |
| 5,280,716 A | 1/1994 | Ryan et al. |
| 5,307,565 A | 5/1994 | Erbrick et al. |
| 5,309,751 A | 5/1994 | Ryan |
| 5,596,800 A | 1/1997 | Holliday et al. |
| 5,609,080 A | 3/1997 | Flavigny |
| 5,680,788 A | 10/1997 | Kootte |
| 5,722,284 A | 3/1998 | Linsmeyer |
| 5,743,131 A | 4/1998 | Holliday et al. |
| 5,845,393 A | 12/1998 | DePaiva et al. |
| 5,870,925 A | 2/1999 | Morris et al. |
| 5,913,933 A | 6/1999 | Beetz et al. |
| 6,053,025 A | 4/2000 | Beetz et al. |
| 6,138,346 A | 10/2000 | Shutts et al. |
| 6,164,107 A | 12/2000 | Korba et al. |
| 6,176,116 B1 | 1/2001 | Wilhelm et al. |
| 6,269,675 B1 | 8/2001 | Burnett |
| 6,279,432 B1 | 8/2001 | Osborn et al. |
| 6,286,358 B1 | 9/2001 | Beetz et al. |
| 6,293,004 B1 | 9/2001 | Holliday |
| 6,672,128 B2 | 1/2004 | Wagner et al. |
| 6,708,396 B2 | 3/2004 | Holliday |
| 6,923,037 B2 | 8/2005 | Bowles et al. |
| 6,941,628 B1 | 9/2005 | Silverfox |
| 7,886,570 B2 * | 2/2011 | Cleland et al. ............... 72/409.1 |
| 8,127,589 B2 * | 3/2012 | Battenfeld ................. 72/409.12 |
| 8,516,872 B2 * | 8/2013 | Battenfeld et al. ......... 72/409.16 |
| 2009/0031778 A1 * | 2/2009 | Hamm et al. .................. 72/407 |

* cited by examiner

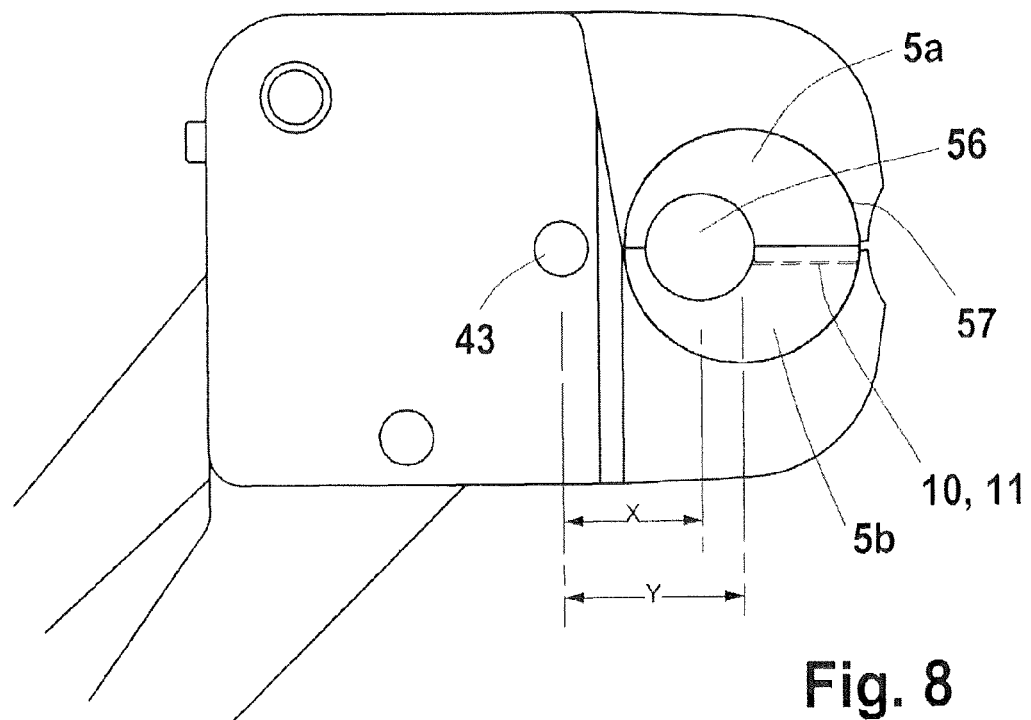
Fig. 8
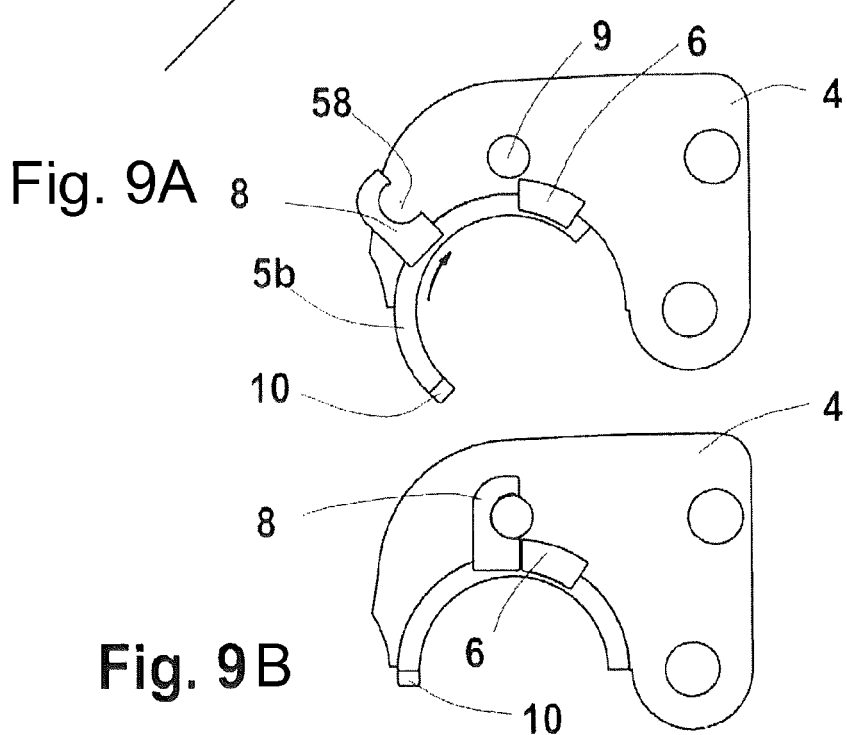
Fig. 9A
Fig. 9B

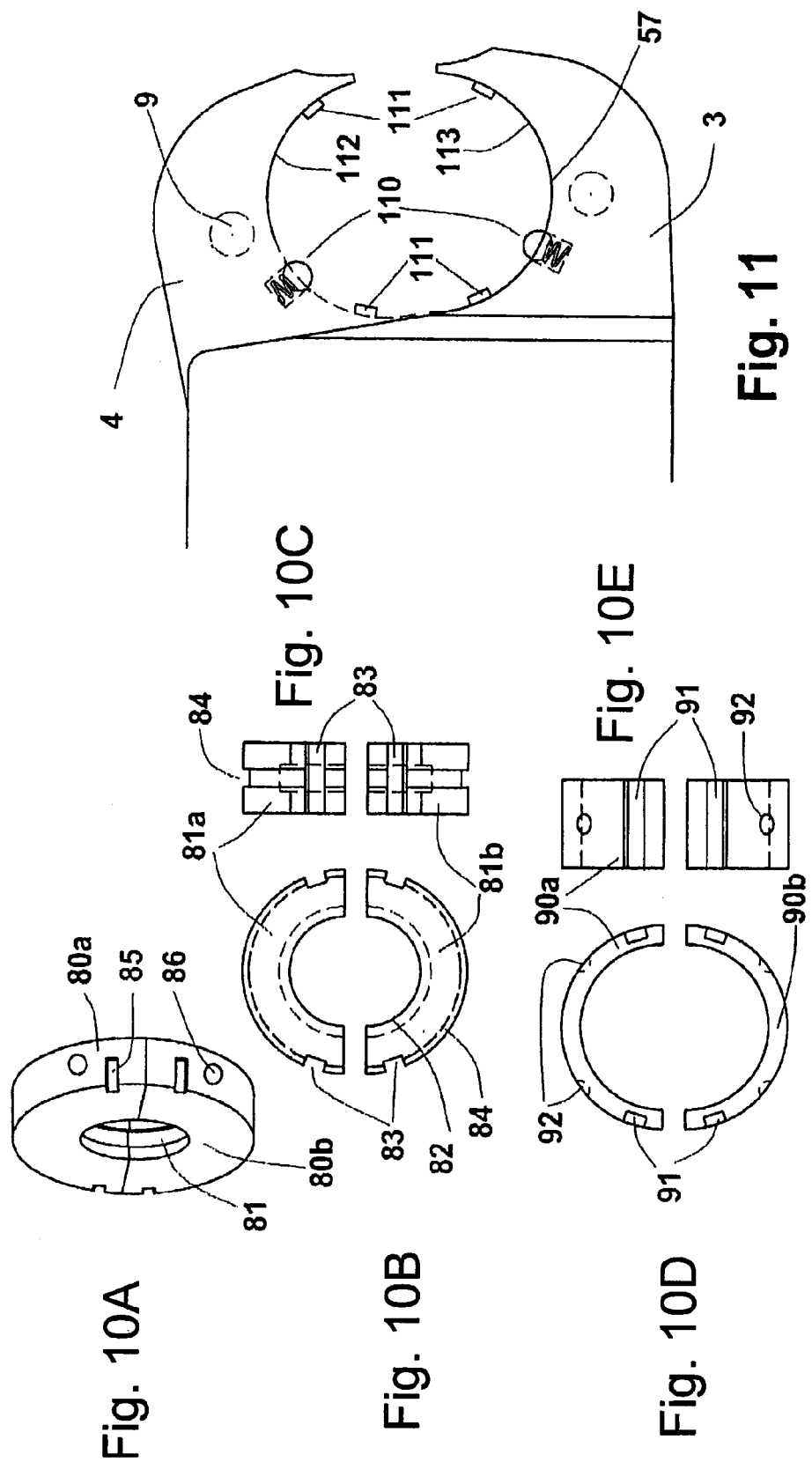

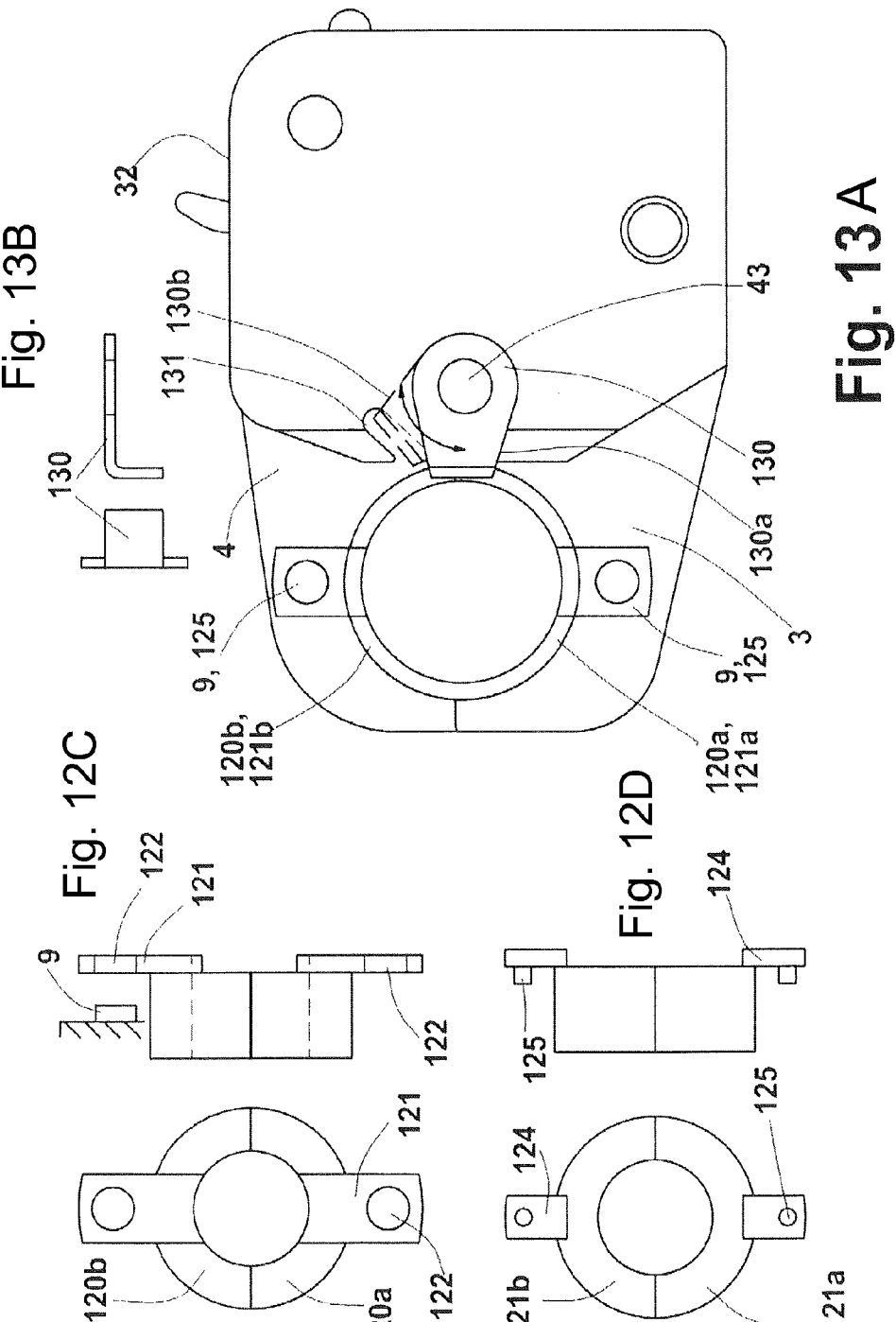

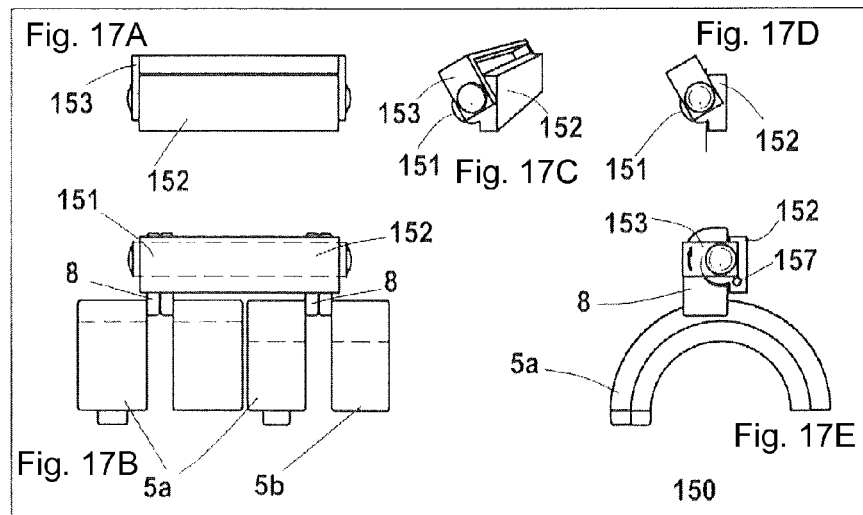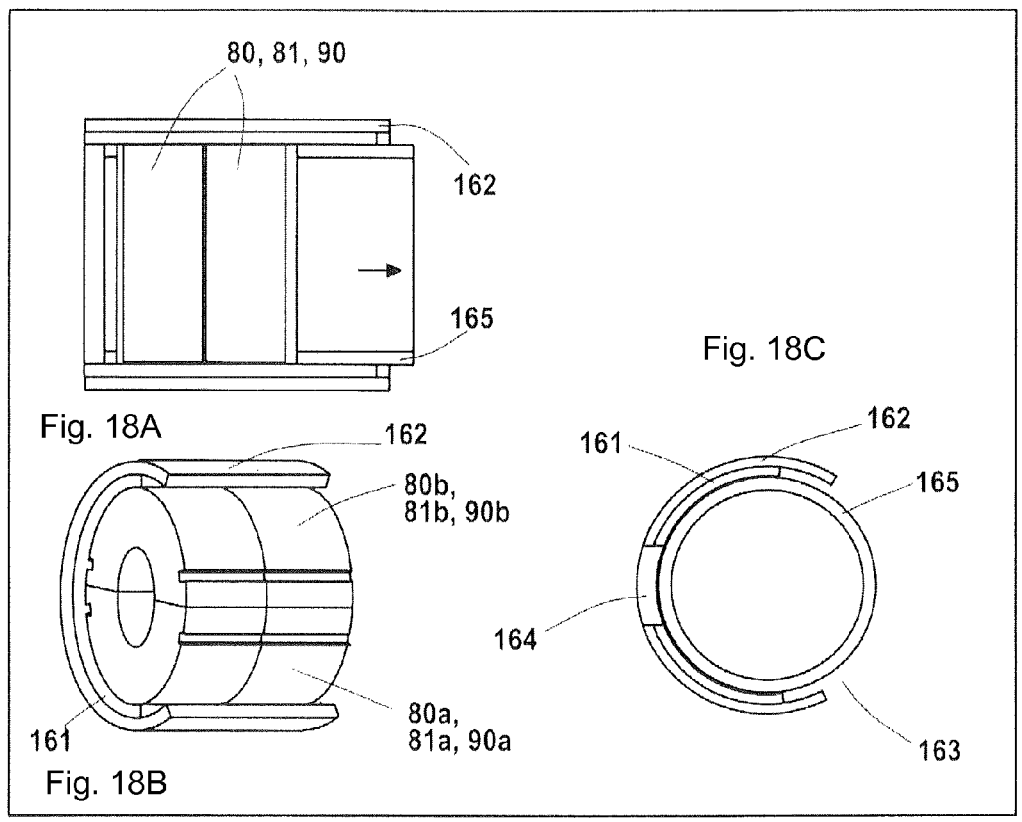

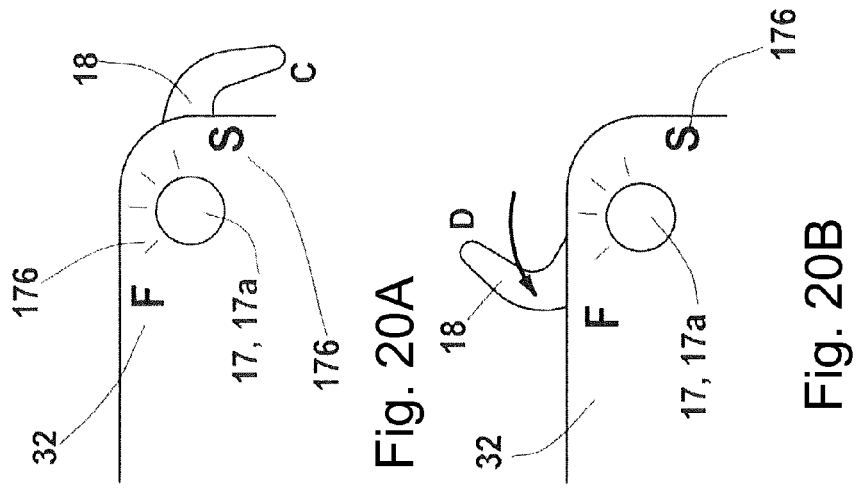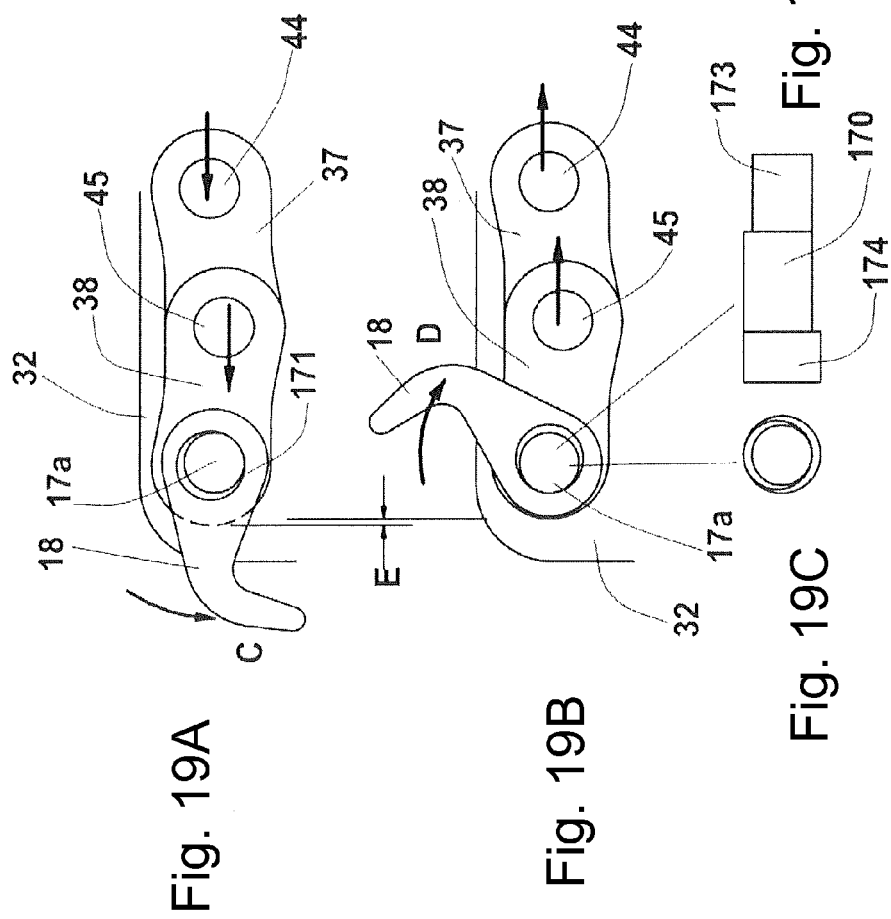

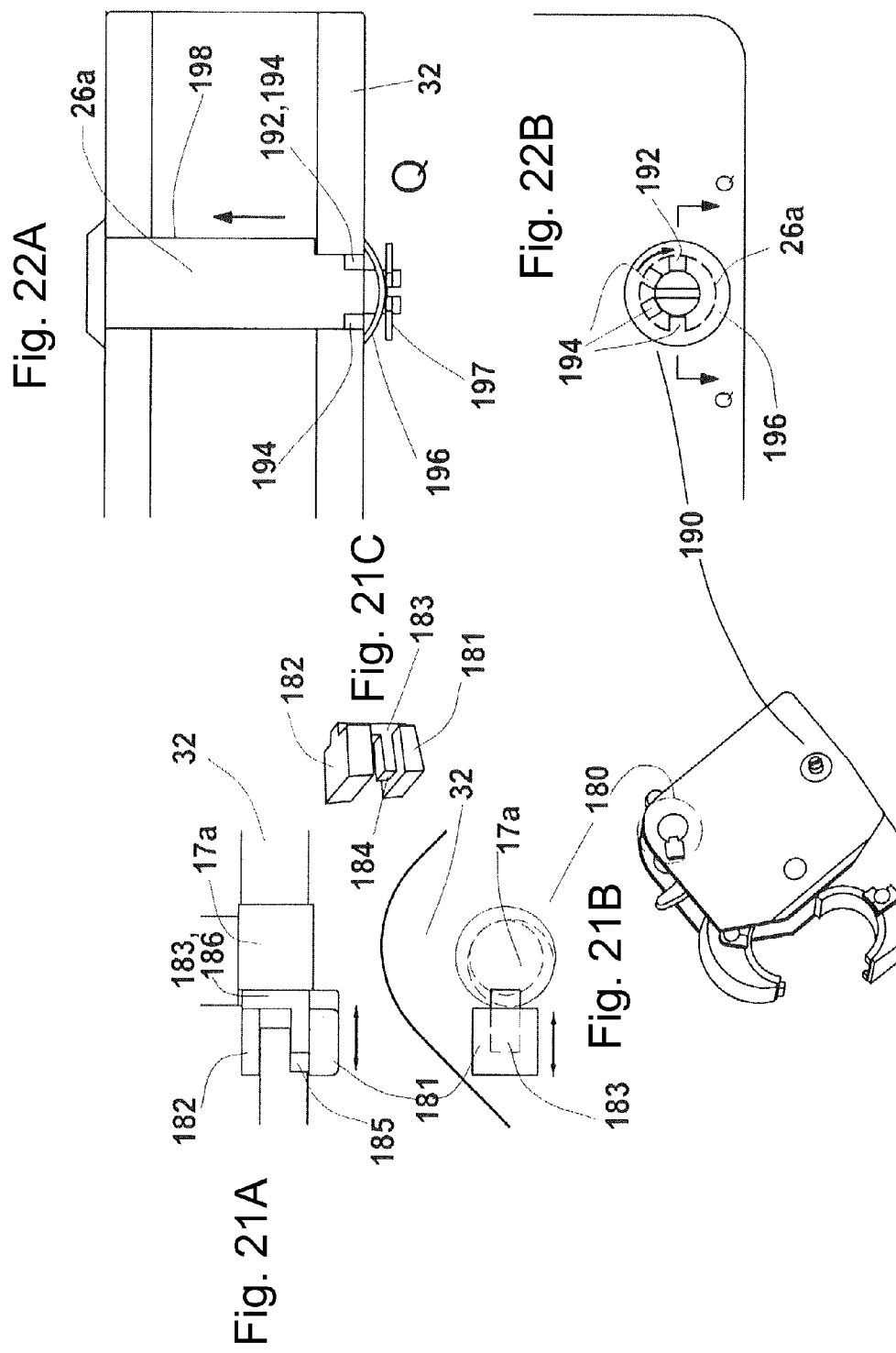

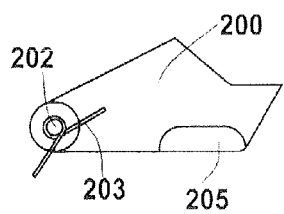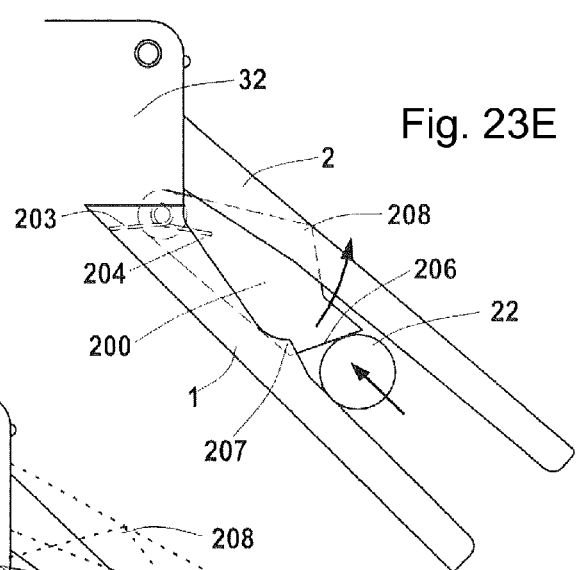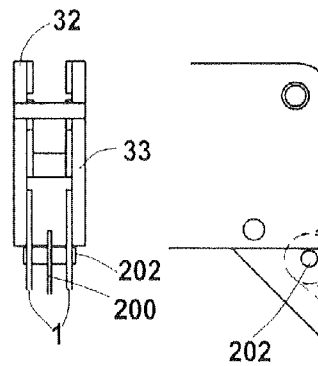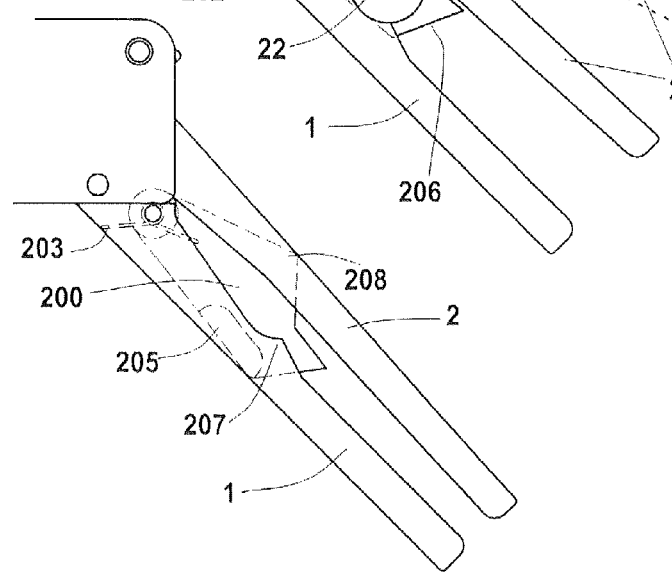
Fig. 23A
Fig. 23B
Fig. 23C
Fig. 23D
Fig. 23E

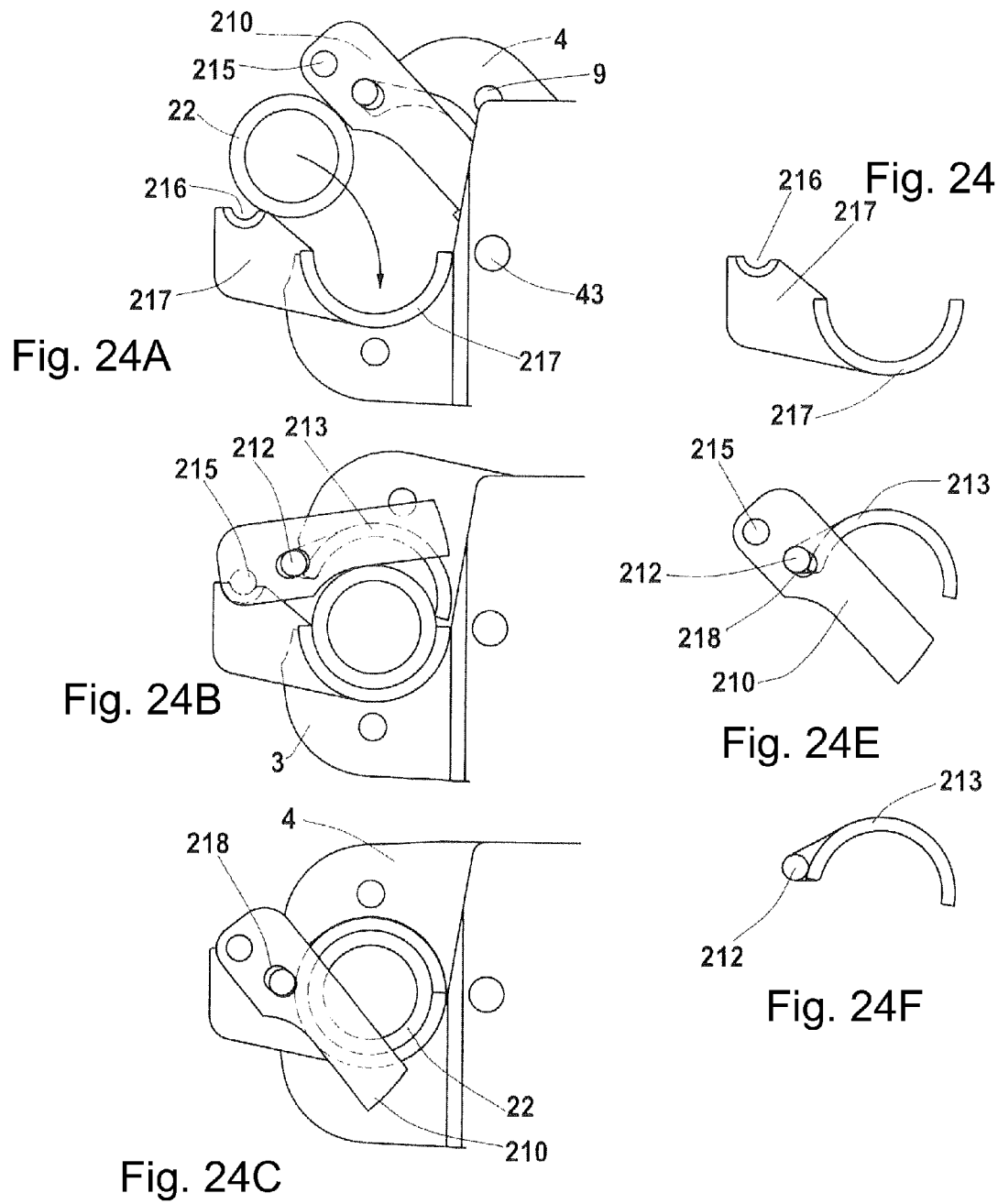

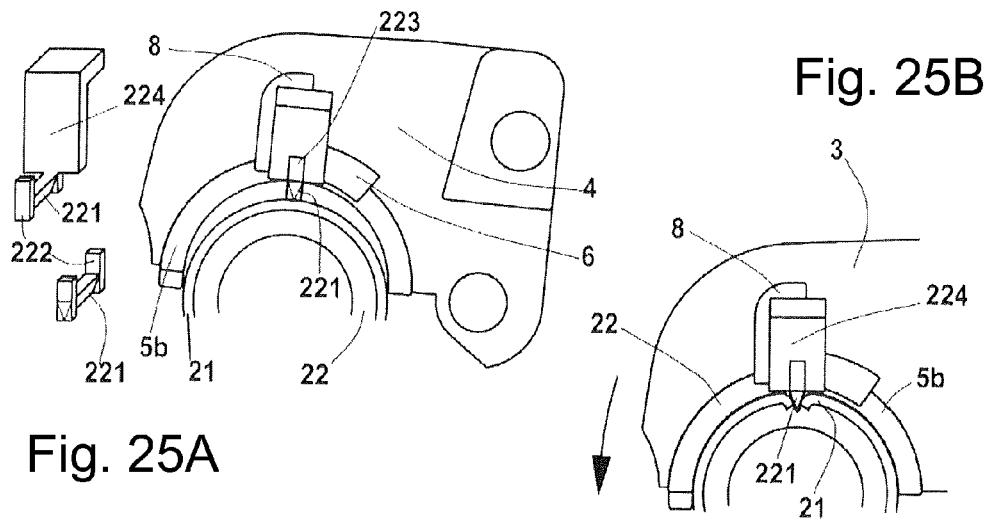
Fig. 25B
Fig. 25A
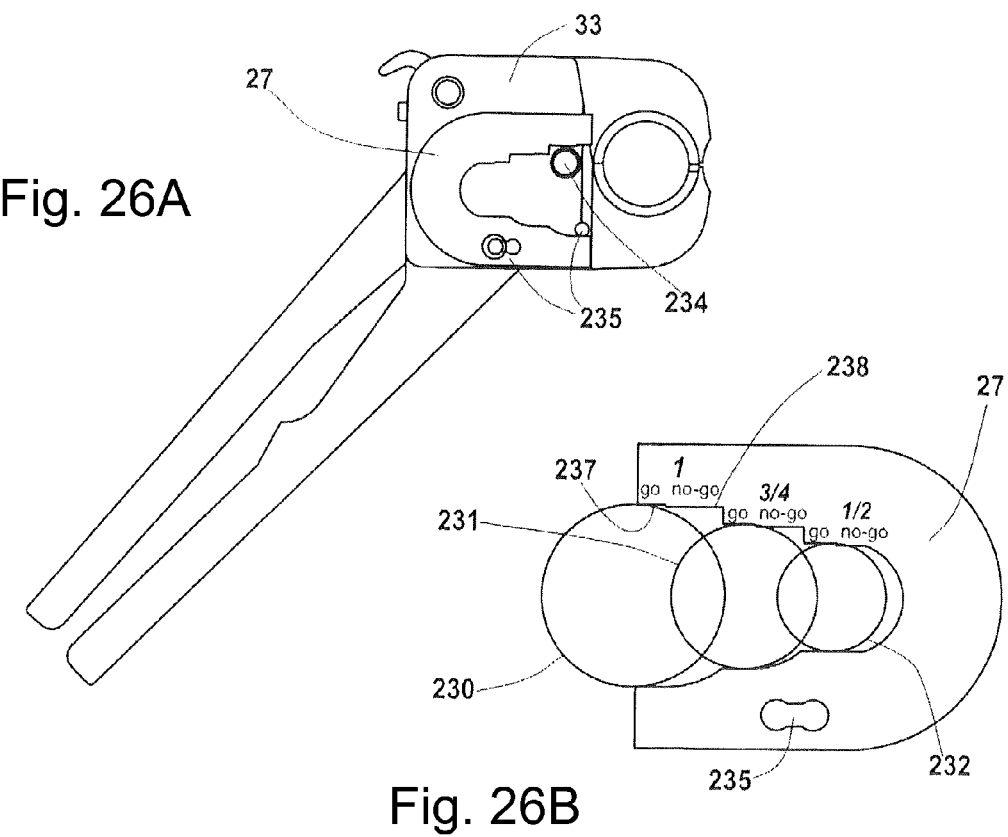
Fig. 26A
Fig. 26B

MULTI-FUNCTIONAL TOOL FOR FLEXIBLE PIPE AND RELATED METHODS

RELATED APPLICATIONS

This application claims priority to U.S. Provisional Application Ser. No. 61/503,788, filed Jul. 1, 2011, the disclosure of which is hereby incorporated by reference in its entirety.

FIELD OF THE INVENTION

The present invention relates to hand tools, and more specifically to tools for connecting, disconnecting and cutting flexible pipes.

BACKGROUND

Flexible plastic pipe, such as cross-linked polyethylene (PEX) pipe, is now widely used for hot and cold water plumbing systems, hydronic radiant heating systems, refrigeration systems and sprinkler systems. Various operations and tools are typically used with these types of pipes. For example, the pipes are generally connected using various connection fittings in order to split the flow through the pipe, to change a length of an existing pipe flow path or run, to make short turns in the pipe path, to change from one size of pipe to another, to cap or plug pipe ends, and so on. As with other pipes, the lengths of flexible plastic pipe may be connected by fittings such as unions, elbows, tees, crosses, reducers and the like. Most flexible plastic water pipe applications in the United States and Canada use pipe sizes of ⅜ inch, ½ inch, ⅝ inch, ¾ inch or 1 inch nominal designations. The most prevalent sizes are ½ inch, ¾ inch and 1 inch.

In addition to connections, there may be other operations when using flexible plastic pipe. For example, the pipe may be cut to a desired length, connection assemblies may need to be removed to make changes or to correct mistakes in installation, and connections may need to be measured or gauged to assure that the connections have been made properly to prevent leaking. One of the most common techniques for connecting plastic flexible pipe to a fitting is by using fittings that are pushed inside the end of the pipe. At the same time, a metal ring or sleeve is placed on the section of pipe that surrounds the fitting, and the ring is squeezed into a smaller diameter using a tool specially designed for that purpose. Fittings typically have circumferential ridges along the section that fits inside the pipe, and the pipe is squeezed onto these ridges to make a watertight seal. Herein, the ring or sleeve squeezing with a tool is referred to as compressing and the tool that is used to squeeze the ring or sleeve is referred to as a compression tool.

There are generally three types of compression rings or sleeves that are used to connect flexible plastic pipe to the fittings: 1) copper rings (CR); 2) stainless steel sleeves (SSS); and 3) stainless steel clamps (SSC). FIG. 1 illustrates representatives of each of the three types of compression rings or sleeves in their various sizes. Naturally, rings or sleeves of an increased size are used to fit larger pipe sizes. The ring or sleeve typically fits snugly on the pipe before compression, and an outer diameter of the ring or sleeve is decreased by about four to eight percent after compression. The CR rings and SS sleeves may be squeezed all around circumferentially by tools such as those shown in FIG. 2. The CR rings or the SS sleeves may be squeezed by a tool with jaws having a small smooth interior diameter, or the SS sleeves may be squeezed by jaws have a central groove around the inside diameter of the jaws. There may be slightly raised sections, which are typically about 1/16 inch wide on compressed rings or sleeves where the jaws of the tool meet up front and back during closure. The tool shown in FIG. 2 is a common compression tool design that is similar to a modified bolt cutter tool. SSC rings may be pulled into a smaller diameter by clamping together the raised portion or clamp ear on the outside of the ring as seen in FIG. 3. The force that is used for compression of all types of rings or sleeves generally increases as the size of the pipe in the pipe fitting diameters increase.

Flexible plastic pipe may be cut by saws or by slicing using knife-edge tubing cutters. Some flexible plastic pipe cutting approaches may require several cutting strokes and/or rotation of the pipe about its axis as the pipe is being cut.

A flexible plastic pipe installer may occasionally find it necessary to disconnect the pipe in order to reconfigure an installation or to correct an installation mistake. For flexible plastic pipe installations that use compression rings or sleeves, the compression rings or sleeves may be cut and/or removed, and the pipe may also be cut in order to disconnect the installation. Cutting the rings or sleeves typically requires considerable force applied to the metal, and a sharp edge to cut a metal ring.

Compression of rings and sleeves, along with placing pipe on fittings and rings or sleeves on pipe, is the most frequent operation in flexible pipe installation. To assure that compressed rings or sleeves are sufficiently tight to prevent leaks, the compressed rings or sleeves may be measured with a compression gauge. It may be desirable to form the compressed ring or sleeve diameter such that it is round and not too tight to reduce or avoid damaging the pipe or the fittings. Therefore, compressed rings or sleeves may be measured with a gauge to ensure that the compressed ring or sleeve diameter is in the proper range, for example within +/−0.008 inch. This type of gauge is generally referred to as a "go no-go" gauge because it indicates whether or not the compressed ring or sleeve is within the range (or a "go") or is outside of the range (or a "no go").

Standards for flexible pipe ring compression may be found, for example, in The American Society for Testing and Materials International (ASTM international) sections such as ASTM F 876, ASTM F 877 and ASTM F 845 and American National Standards Institute NSF/ANSI 14-2008. Standards may be based on extensive leak testing under elevated pressure and temperature conditions. Typically, separate tools may be used for the flexible plastic pipe operations of connecting (compression), ring cutting, pipe cutting, and testing the pipe with a gauge. In addition, many flexible plastic pipe applications may use separate tools for each different sizes of pipe connection, i.e., ⅜ inch, ½ inch, ⅝ inch, ¾ inch and 1 inch compression tools. Moreover, separate tools may be used for each type of ring or sleeve, i.e., different tools may be used for CR rings, SS sleeves and SSC rings a plumber who installs all types and sizes of connections may require 8 to 15 or more different tools. In the case of CR rings and SS sleeves, the tool jaws may each enclose a different size of circle to accommodate each pipe size. Larger pipe sizes generally require increased mechanical advantage or more hand force to produce the higher compression or cutting forces. In some cases, the tool handle length and/or the mass of the tool may be increased for structural strength to accommodate larger pipe sizes. Thus, in addition to using many different types of tools, the tools may be very large and/or heavy.

Different tools for ring cutting and pipe cutting may have particular jaw, handle and cutting surface designs to accommodate different types of rings or sleeves or different sizes of rings or sleeves and pipes. Moreover, the gauges may be separate from the other tools and may use a separate opening for measuring the high and the low limits for each of the different diameter sizes of compressed rings or sleeves. For example, a "go no-go" gauge for gauging ½ inch, ¾ inch and 1 inch pipe rings or sleeves would typically have six separate openings.

SUMMARY OF EMBODIMENTS OF THE INVENTION

According to some embodiments, a compression tool includes a first jaw member; a second jaw member pivotally connected to the first jaw member at a first pivot location; a first handle connected to the second jaw member, and a second handle connected to the first jaw member. The first and second jaws are configured to move between an open position and a closed position to thereby connect flexible pipe by compressing flexible pipe connecting rings or sleeves. A plurality of collars has two or more associated circumferences for compressing different sizes and different types of rings or sleeves. Each of the plurality of collars includes a first collar portion that is removably attached to the first jaw member and a second collar portion that is removably attached to the second jaw member. Movement of the first and second jaw members, together with attached collar portions, between the open position and the closed position around a pipe connecting ring or sleeve reduces a circumference of the pipe connecting ring or sleeve thereby providing a pipe connection seal. The closure of a single hand around both the first and second handles closes the first and second jaws and collar portions to reduce the original ring or sleeve circumference to a circumference providing a flexible pipe connection seal.

In some embodiments, a first link is pivotally connected to the second jaw member at a second pivot location, and a second link is pivotally connected to the first link at a third pivot location and pivotally connected to the first jaw member at a fourth pivot location. The first handle is a moving handle attached to the third pivot location, the second handle is a fixed handle rigidly connected to the first jaw member, the first jaw member is a fixed jaw member, and the second jaw member is a moving jaw member that is configured to move together with the first handle. A third link is pivotally connected to the first handle at a fifth pivot location and pivotally connected at an opposite second end thereof to the first jaw member at a sixth fixed pivot location. A first biasing member is configured to bias the third link so as to move the first handle and the second handle and the first jaw and the second jaw toward the closed position. Closing the first handle toward the second handle drives the first and second links through the third pivot location to rotate the second jaw member about the first pivot location in a first rotational direction, to rotate the first link in the first rotational direction, to rotate the second link in a second, opposite, rotational direction, and to rotate the third link in the first rotational direction about the sixth pivot location, to thereby move the first and second jaw members to the closed position. The jaws are configured to be opened to accept rings or sleeves for compression by pulling the first moving handle back away translationally from the first pivot location and rotationally about the third and fifth pivot locations. The first moving handle is configured to maintain the first and second jaw members in the open position, the closed position and one or more intermediate positions between the open position and the closed position.

In some embodiments, the first and second jaws have an opening of one size to enclose the plurality of collars, and the first and second collar portions of the plurality of collars each define a different diameter and ring or sleeve contact surfaces having a width and inner radius that is sized to form flexible pipe connection seals by single-handed compression from an original ring or sleeve circumference to a final compressed ring or sleeve circumference. Ones of the plurality of collars may define a center of an inner circumference thereof that is offset from a center of an inner circumference of the first and second jaw members in a direction toward the first pivot location to thereby provide mechanical advantage during ring or sleeve compression. One of the first and second collar portions may include a tongue and another one of the first and second collar portions may include a groove that mates with the tongue at corresponding ends of the other one of the first and second collar portions such that the first and second collar portions more extensively encircle a compression ring or sleeve during engagement of the ring or sleeve by first and second collar portions and a ring or sleeve circumference length is maintained.

In some embodiments, the tool includes collar holding locations comprising respective jaw tabs on a side of each of the first and second jaw members, respective jaw pins on the first and second jaw members, and respective cooperating slotted collar tabs on the first and second collar portions of the plurality of collar members. The first and second collar portions are configured to rotationally slide inside the jaw tabs such that the collar tabs are slidably received next to the sides of each of the first and second jaw members and engage the jaw pins to thereby hold the first and second collar portions axially, rotationally and radially in a compressing position in the first and second jaw members, respectively. A portion of the jaw pins, jaw tabs and/or first and second collar portions may be magnetic such that the jaw pins and/or jaw tabs magnetically engage the first and second collar portions. In some embodiments, the collar tabs are configured to engage the jaw pins and a latch affixed to the tool is configured to move to hold the first and second collar members axially in the first and second jaw members, respectively, so that the first and second collar members maintain a position on a ring or sleeve throughout compression. Apertures on an outside circumference of the first and second collar members mate with a corresponding pin and/or ball plunger on an inside radius of the corresponding first and second jaw members to hold the first and second collar members axially in the first and second jaw members, respectively, so that the first and second collar members maintain a position on a ring or sleeve throughout compression.

In some embodiments, the first and second jaw members include respective tips that are configured to clamp rings or sleeves of different sizes having clamping ears that reduce a compression ring or sleeve circumference. The tips are configured to break a ring or sleeve clamp and remove a ring or sleeve from a pipe connection by grasping a ring or sleeve clamped surface and twisting to break the ring or sleeve clamp.

In some embodiments, the tool includes a collar storage holder. The collar tab slots are configured to be received on a first cooperating holding member on the holder such that a slotted tab end contacting another holding member on the holder and the collar tabs are further held by a strap member rotated into position at the a collar tab surface opposite the tab slot.

In some embodiments, a first cam at the fourth pivot location is configured to change a force exerted for ring or sleeve compression or cutting by translating the first and second links away from the pivot location to further close the first and second jaw members. The cam may be rotated manually with a lever portion at the fourth pivot location and permits a plurality of movements of the first and second handles with corresponding progressive jaw closures to a final cam position at a final ring or sleeve compression position. The manually selected cam position is configured before ring or sleeve compression or cutting to locate the first and second handles to an open position selected for an operator's desired hand position.

In some embodiments, a movable catch, ball plunger, or friction stop member is attached to the tool and configured to hold the cam in a single rotational position to thereby disable free cam rotation by friction with the second link at the fourth pivot location and also thereby disable multiple positions and corresponding successive manual squeezing forces.

In some embodiments, an adjustment feature is configured to compensate for wear of parts and to re-calibrate compression rings' or sleeves' compressed circumference. The adjustment feature includes a second cam positioned at the sixth pivot location and configured to translate the third link and the third and fifth pivot locations such that the second cam is configured to move to different positions using a rotation stop that is configured to be released by pushing the cam axially to release the stop, rotating the second cam to a different stop position, and moving the second cam in an opposite axial direction to reengage the stop. The second cam is axially biased to an engaged stop position. In some embodiments, the tool includes tips on the first and second jaw members that are configured to clamp pipe connecting rings or sleeves that have clamping ears configured to reduce the ring or sleeve circumference such that the first cam is configured to be positioned rotationally to permit an opening of the first and second jaw members and first and second handles for beginning and completing compression of the rings or sleeves by the closure of a single hand around both the first and second handles.

In some embodiments, the tool includes a cutting blade that is configured to cut pipe. The cutting blade is attached at a seventh pivot position such that the cutting blade moves between the first and second handles and is biased to a neutral position such that a sharp edge of the cutting blade is held inside the second handle of the tool and the cutting blade is movable between a stowed position and a pipe cutting position by sliding a pipe between the first and second handles and against the cutting blade end opposite the seventh pivot position to push the cutting blade away from the second handle until the until the pipe is held in position on an interior side of the second handle so that the cutting blade contacts the first handle. When the first and second handles are moved to the position where the first handle touches the pipe, the cutting blade is configured to be positioned through a pipe between the first and second handles to thereby cut the pipe. The cutting blade and first and second handles may be sized and configured to move using single hand operation to cut the pipe and the cutting blade does not inhibit movement of the first handle except from pressure by the pipe during cutting or by a biasing force to a neutral position when the first and second handles are moved together during pipe cutting or when closed during ring or sleeve compression or cutting.

In some embodiments, the tool includes a cutting blade that is configured to cut pipe. The cutting blade is pivotally and rotationally connected by a first pin to one of the first collar portions that is positioned in the second jaw and with a second pin at a distal end of the cutting blade that is configured to rest in a pin holding location that is provided as part of one of the second collar portions that is removably affixed to the first jaw member. When a pipe is placed in the second collar portion and when the first and second jaw members are in the open position, the first and second handles and the first and second jaws are subsequently closed, the second pin in the cutting blade is moved into the holding location on the second collar position and the first pin is pushed by the first collar portion to push the cutting blade through the pipe while the first and second handles are moved to the closed position to thereby cut the pipe.

In some embodiments, the tool includes a cutting edge and holding ends configured to cut compressed rings to be removed from pipe connections. The cutting edge is configured to be removably affixed in one of the first or second jaws and/or one of the plurality of collars in the jaws and when a compressed ring on a pipe is positioned within the first and second jaws and the first and second handles are moved to a closed position, the cutting edge is moved against the ring to thereby cut the ring in a substantially radial orientation.

In some embodiments, the tool includes a "go no-go" gauge removably attached to the tool. The "go no-go" gauge comprises an opening that has a plurality of inner diameters accessed by a single opening and configured to measure corresponding diameters of compressed rings or sleeves for different pipe size connections.

In some embodiments a compression tool includes a first jaw member; a second jaw member pivotally connected to the first jaw member at a first pivot location; a first handle connected to the second jaw member; and a second handle connected to the first jaw member. The first and second jaws are configured to move between an open position and a closed position to thereby connect flexible pipe by compressing flexible pipe connecting rings or sleeves. Movement of the first and second jaw members between the open position and the closed position around a pipe connecting ring or sleeve reduces a circumference of the pipe connecting ring or sleeve thereby providing a pipe connection seal, and the closure of a single hand around both the first and second handles closes the first and second jaws to reduce the original ring or sleeve circumference to a circumference providing a flexible pipe connection seal. The tool is adaptable for connecting flexible pipe by using a manually adjusted variation of hand force during compression of a flexible pipe ring or sleeve; and/or adaptable for cutting of said flexible pipe; and/or adaptable for cutting of compression rings or sleeves; and/or adaptable for measuring compressed rings or sleeves; and/or adaptable for readjusting and re-calibrating for wear and dimension change of the compression tool mechanisms; and/or adaptable for clamping clamp rings or sleeves of different sizes that have clamping ears that reduce a compression ring or sleeve circumference.

In some embodiments, the tool includes a first link pivotally connected to the second jaw member at a second pivot location, and a second link pivotally connected to the first link at a third pivot location and pivotally connected to the first jaw member at a fourth pivot location. The first handle is a moving handle attached to the third pivot location, the second handle is a fixed handle rigidly connected to the first jaw member, the first jaw member is a fixed jaw member and the second jaw member is a moving jaw member that is configured to move together with the first handle. A third link is pivotally connected to the first handle at a fifth pivot location and pivotally connected at an opposite second end thereof to the first jaw member at a sixth fixed pivot location. A first biasing member is configured to bias the third link so as to move the first handle and the second handle and the first jaw and the second jaw toward the closed position. Closing the first handle toward the second handle drives the first and second links through the third pivot location to rotate the second jaw member about the first pivot location in a first rotational direction, to rotate the first link in the first rotational direction, to rotate the second link in a second, opposite, rotational direction, and to rotate the third link in the first rotational direction about the sixth pivot location, to thereby move the first and second jaw members to the closed position. The jaws are configured to be opened to accept rings or sleeves for compression by pulling the first moving handle back away translationally from the first pivot location and rotationally about the third and fifth pivot locations. The first moving handle is configured to maintain the first and second jaw members in the open position, the closed position and one or more intermediate positions between the open position and the closed position.

In some embodiments, the first and second jaw members include respective tips that are configured to clamp rings or sleeves of different sizes having clamping ears that reduce a compression ring or sleeve circumference, and the tips are configured to break a ring or sleeve clamp and remove a ring or sleeve from a pipe connection by grasping a ring or sleeve clamped surface and twisting to break the ring or sleeve clamp.

In some embodiments, the tool includes a first cam at the fourth pivot location that is configured to change force exerted for ring or sleeve compression or cutting by translating the first and second links away from the pivot location to further close the first and second jaw members. The first cam may be rotated manually with a lever portion at the fourth pivot location and permits a plurality of movements of the first and second handles with corresponding progressive jaw closures to a final cam position at a final ring or sleeve compression position. The manually selected cam position may be configured before ring or sleeve compression or cutting to locate the first and second handles to an open position selected for an operator's desired hand position.

In some embodiments, the tool includes a movable catch, ball plunger, or friction stop member attached to the tool configured to hold the first cam in a single rotational position to thereby disable free cam rotation by friction with the second link at the fourth pivot location and also thereby disable multiple positions and corresponding successive manual squeezing forces. The tool may include an adjustment feature configured to compensate for wear of parts and to re-calibrate compression rings' or sleeves' compressed circumference. The adjustment feature includes a second cam positioned at the sixth pivot location and configured to translate the third link and the third and fifth pivot locations such that the second cam is configured to move to different positions using a rotation stop that is configured to be released by pushing the cam axially to release the stop, rotating the second cam to a different stop position, and moving the second cam in an opposite axial direction to reengage the stop. The second cam may be axially biased to an engaged stop position.

In some embodiments, the tool includes tips on the first and second jaw members configured to clamp pipe connecting rings or sleeves that have clamping ears configured to reduce the ring or sleeve circumference such that the first cam is configured to be positioned rotationally to permit an opening of the first and second jaw members and first and second handles for beginning and completing compression of the rings or sleeves by the closure of a single hand around both the first and second handles.

In some embodiments, the tool includes a cutting blade configured to cut pipe. The cutting blade is attached at a seventh pivot position such that the cutting blade moves between the first and second handles and is biased to a neutral position such that a sharp edge of the cutting blade is held inside the second handle of the tool and the cutting blade is movable between a stowed position and a pipe cutting position by sliding a pipe between the first and second handles and against the cutting blade end opposite the seventh pivot position to push the cutting blade away from the second handle until the until the pipe is held in position on an interior side of the second handle so that the cutting blade contacts the first handle. When the first and second handles are moved to the position where the first handle touches the pipe, the cutting blade is configured to be positioned through a pipe between the first and second handles to thereby cut the pipe. The cutting blade and first and second handles may be sized and configured to move using single hand operation to cut the pipe and the cutting blade does not inhibit movement of the first handle except from pressure by the pipe during cutting or by a biasing force to a neutral position when the first and second handles are moved together during pipe cutting or when closed during ring or sleeve compression or cutting.

In some embodiments, the tool includes a cutting edge and holding ends configured to cut compressed rings to be removed from pipe connections. The cutting edge is configured to be removably affixed in one of the first or second jaws. When a compressed ring on a pipe is positioned within the first and second jaws and the first and second handles are moved to a closed position, the cutting edge is moved against the ring to thereby cut the ring in a substantially radial orientation.

In some embodiments, the tool includes a "go no-go" gauge removably attached to the tool. The "go no-go" gauge includes an opening having a plurality of inner diameters accessed by a single opening and configured to measure corresponding diameters of compressed rings or sleeves for different pipe size connections.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 8 is a side view of the side plates and jaws of the tool of FIGS. 4A-4B showing a collar for compressing CR rings or SS sleeves with the collar hole offset from the jaws hole according to some embodiments of the present invention.

FIGS. 9A-9B are side views of the upper jaw of the tool showing a collar half with a slotted tab and showing the jaw with a second holding tab and a pin to accept the slotted collar tab to hold the collar according to some embodiments of the present invention.

FIGS. 10A-10E show side and perspective views of collars without tabs and for compression of CR rings or SS sleeves incorporating ball plungers and bars to secure the collars in the jaws of the tool of FIGS. 4A-B according to some embodiments of the present invention.

FIG. 11 is a side view of the jaws of tool of FIGS. 4A-4B illustrating the location of the bars and ball plungers to secure the collars of FIGS. 10A-10E according to some embodiments of the present invention.

FIGS. 12A-12D are illustrations of collars for compression of CR rings or SS sleeves utilizing tabs with through holes to accept pins in the jaw of the tool of FIGS. 4A-4B to secure the collars in the tool according to some embodiments of the present invention.

FIG. 13A is a side view of the tool of FIGS. 4A-4B with a latch to aid in securing the collars of FIGS. 12A-12D in the tool according to some embodiments of the present invention.

FIG. 13B is a side view of the latch of FIG. 13A

FIGS. 17A-17E illustrates a collars holder for collars with slotted tabs as shown in FIGS. 9A-9B according to some embodiments of the present invention.

FIGS. 18A-18C illustrate a collars holder for collars without tabs as shown in FIGS. 10A-10E according to some embodiments of the present invention.

FIGS. 19A-19D are side views of the tool of FIGS. 4A-4B with a side plate removed to illustrate the interaction of a cam and lever as the position of the cam varies from the starting position for compression to the final position for compression of CR rings, SS sleeves and SSC rings according to some embodiments of the present invention.

FIGS. 20A-20B are views of the opposite side of the tool of FIGS. 19A-19D showing the position of the lever relative to ring compression beginning and ending marks on the side plate of the tool according to some embodiments of the present invention.

FIGS. 21A-21D show the tool of FIGS. 4A-4B with a movable lock for the cam pin of FIGS. 19A-19D that prevents the cam pin from changing position when selected according to some embodiments of the present invention.

FIGS. 22A-22B show a second cam pin in the tool of FIGS. 4A-4B that acts to compensate for wear on tool mechanisms according to some embodiments of the present invention.

FIGS. 23A-23E show side views of the tool of FIGS. 4A-4B with cutting blade located between the handles of the tool for cutting different sizes of flexible pipe according to some embodiments of the present invention.

FIGS. 24A-24F show views of an alternative cutting blade and mechanism located in the jaws of the tool for cutting flexible pipe of different sizes according to some embodiments of the present invention.

FIGS. 25A-25B are side views of the upper jaw of the tool of FIGS. 4A-4B showing cutting edge with holding ends for removing CR rings from flexible pipe according to some embodiments of the present invention.

FIGS. 26A-26B are side views of the tool of FIGS. 4A-4B having a "go no-go" snap gauge removably attached to the tool according to some embodiments of the present invention.

DETAILED DESCRIPTION OF EMBODIMENTS OF THE INVENTION

Figure 1:
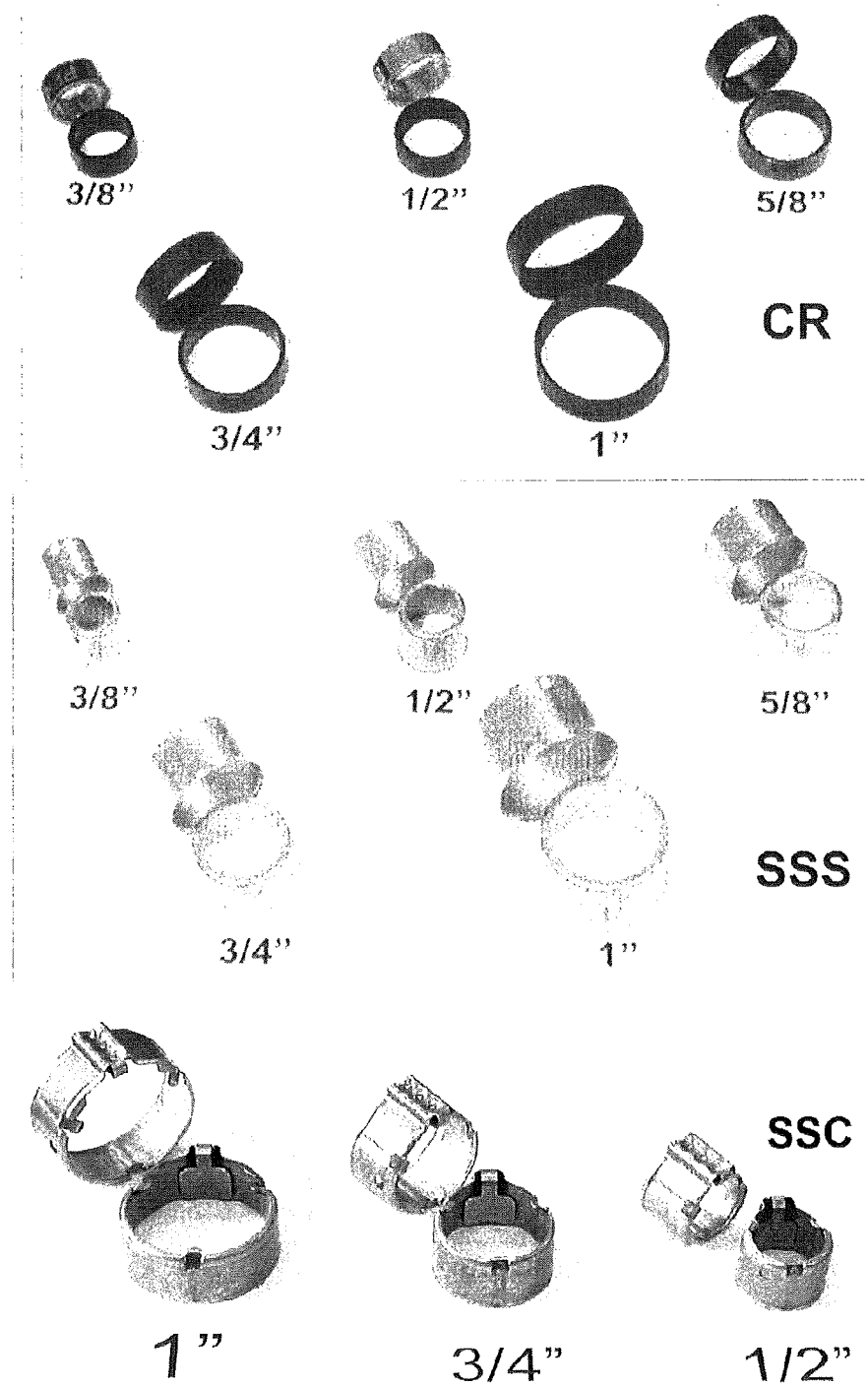
FIG. 1 (PRIOR ART) is a digital image of representative CR, SS, and SSC pipe compression rings or sleeves.
Figure 2:
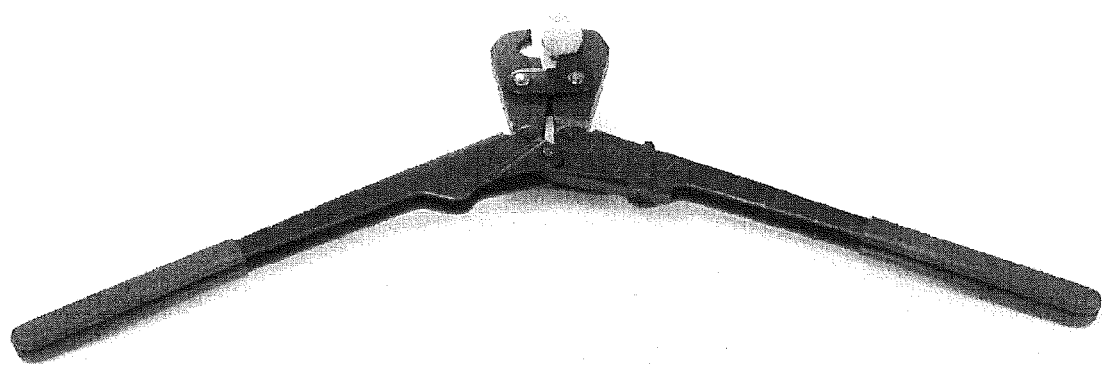
FIG. 2 (PRIOR ART) is a digital image of a prior art, two-handed, wide-handle-opening pipe compression tool, ring and pipe that illustrates a compression operation that may be performed using CR rings or SS sleeves.
Figure 3:
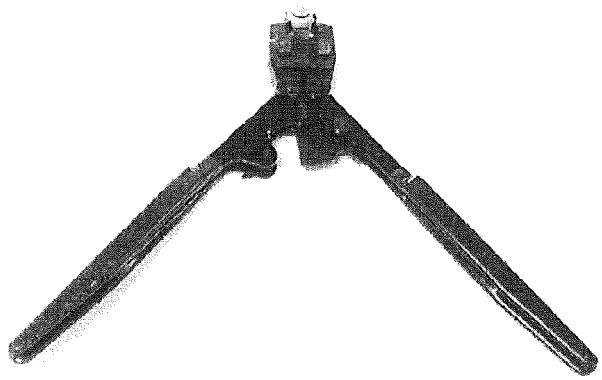
FIG. 3 (PRIOR ART) is a digital image of a prior art two-handed, wide-handle-opening pipe compression tool, ring and pipe that illustrates a compression operation that may be performed using SSC sleeves.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

In particular, for clarity, the terms 'front' and 'forward' generally refer to the end of a tool that is made up of the jaws for compressing or cutting while the term 'back' or 'backward' refers to the opposite end from 'front' or 'forward' where a moving handle emerges for gripping by the operator's hand. The terms 'top, 'upward,' or 'upper' refer to the part of the tool represented toward the top side of a drawing, or generally the tool part including the moving jaw of the tool, as opposed to the 'bottom,' 'downward,' or 'lower part of the tool' which holds the fixed jaw to the side plates of the tool. The terms 'bottom' or 'lower' are generally refer to that part of a tool where the fixed handle is held to the side plates of the tool.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

In some embodiments, a multi-functional hand tool for application with flexible plastic water pipe, connecting rings, and fittings may be provided. The tool may be designed to attach connecting rings or sleeves of all three commonly used types and for all sizes within types up to and including ring or sleeve sizes for connecting one inch pipe or greater. The collars may have tongues on one or both ends of a collar half and a mating groove on one or both ends of the mating half of the collars. The tool may include a cam and lever for adjusting the required hand force and length of single hand stroke for compressing a ring or sleeve. The tool may have a stop for holding the cam and lever in a fixed rotational position. The tool may include a cam for compensating for wear in the mechanisms of the tool. The tool may remove common compression and compressing types of rings from pipe and fittings. The multi-functional tool may include a pipe cutter, an attachable snap gauge for measuring compressed rings, and a carrying case for holding, removing and inserting compressing and collars as described herein.

The multi-functional tool according to some embodiments may consolidate various different types of tools for flexible water pipe installation and removal into one tool. In some embodiments, between 2 and 8 or as many as 15 or more different types of tools may be consolidated into a multi-functional tool for flexible water pipe installation. In some embodiments compresses and cuts pipe rings with one hand and overcomes most of the problems of compressing in tight spaces and aligning a large bulky tool on a small ring or sleeve, as described, for example, in U.S. Pat. Nos. 5,267,464 and 7,503,201, the disclosures of which are hereby incorporated by reference in their entireties. The multi-tool allows use of collars for multiple sizes and types of rings while still providing compact mechanical advantage for compressing with one hand. Other tools often accomplish such mechanical advantage by moving handles many times, e.g., more than six to nine times, the distance moved by closure of a hand.

The broad spectrum of applications of the multi-functional tool to flexible plastic pipe may provide multiple hand squeezing strokes, compressing of large rings by moderate hand force, and tool recalibration for wear. In some embodiments, holding attachments or collars in the tool may be used to address the wide spectrum of ring or sleeve types and sizes and various types of ring or sleeve compressing, cutting, and removal and pipe cutting may be provided with a tool length of less than 11½ inches and with a single hand grasping the tool handles.

Particular embodiments of the present invention will now be discussed with reference to the figures. FIGS. 4A-4B illustrate a compact compression hand tool 7 that includes a set of handles 1, 2 and jaws 3, 4. The jaws 3, 4 may further include removable collars 5 comprising two collar halves 5a and 5b, which are shown held in the jaws 3, 4 by tabs 6 on the jaws 3, 4 and slotted tabs 8 on the collar halves 5a and 5b which may slide onto pins 9 affixed to the jaws 5a and 5b. There may be a tongue 10 and a mating groove 11 on one or both ends of the collars 5a and 5b. The collars 5 may include an outer circumference 12 and each collar half 5a, 5b may include a half circles that define an opening or hole 13. There may be clamping tips 15 on the jaws 3, 4 which may be used for compressing rings with clamping ears, e.g., when the collars 5 are removed from the jaws 3, 4. Between the handles 1, 2, there may be a cutting blade 16 for cutting flexible pipe. The compact hand tool 7 may also comprise an adjusting cam 17, 17a and lever 18 for varying the hand-force and handle position needed for compression of a ring or sleeve 21 onto a flexible pipe 22 and fitting 23, shown as examples in FIGS. 4A-4B. A cam stop 25 on the tool 7 may be applied for holding the force-adjusting cam 17a in one position. A second cam 26, 26a may be applied to compensate and recalibrate for wear in tool mechanisms. The hand tool 7 may further include a removable "go no-go" gauge 27 for measuring the diameter of compressed rings or sleeves 21. A cutting edge with holding ends 29 for cutting compressed rings to be removed from flexible pipe connections may be placed in jaws 3, 4 and collars 5 and removed after cutting a compressed ring. The tool 7 also includes two integral or rigidly attached side plates 32 and 33 and half circles or holes 34 (see FIGS. 9A-9B) in the jaws 3, 4.

Figure 5:
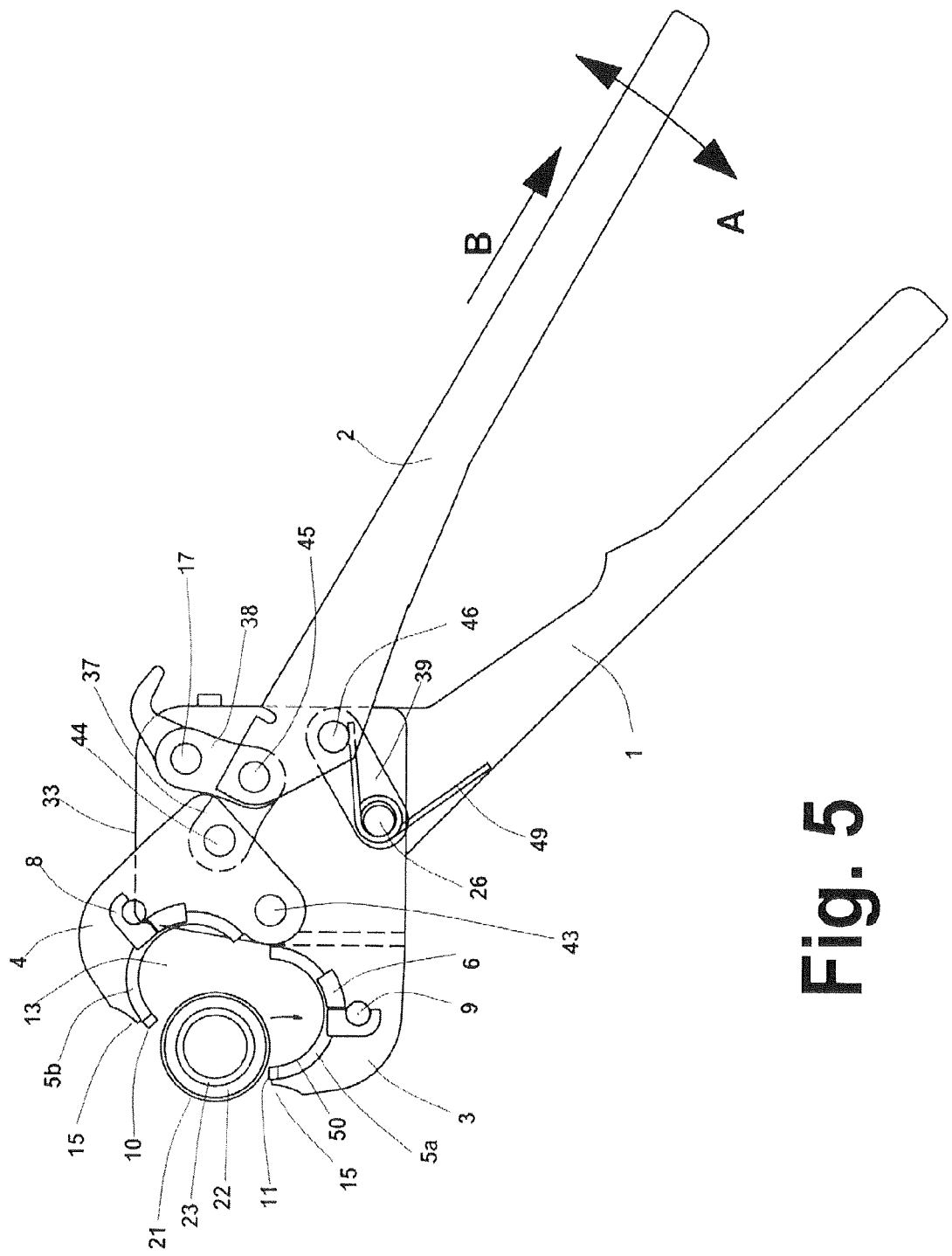
FIG. 5 is a side view of the tool of FIGS. 4A-4B with a side plate removed showing the tool with collars open to receive a pipe with either CR or SS type ring or sleeve for compression according to some embodiments of the present invention.
Figure 6:
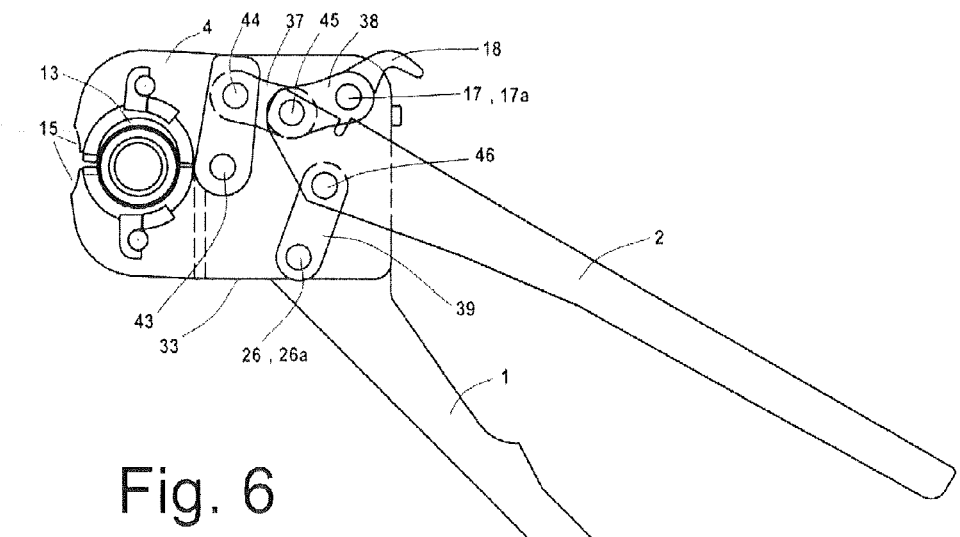
FIG. 6 is a side view of the tool of FIGS. 4A-4B with a side plate removed showing the jaws of the tool closing around the pipe of FIG. 5, with the collars just beginning to touch the CR or SS type ring or sleeve according to some embodiments of the present invention.
Figure 7:
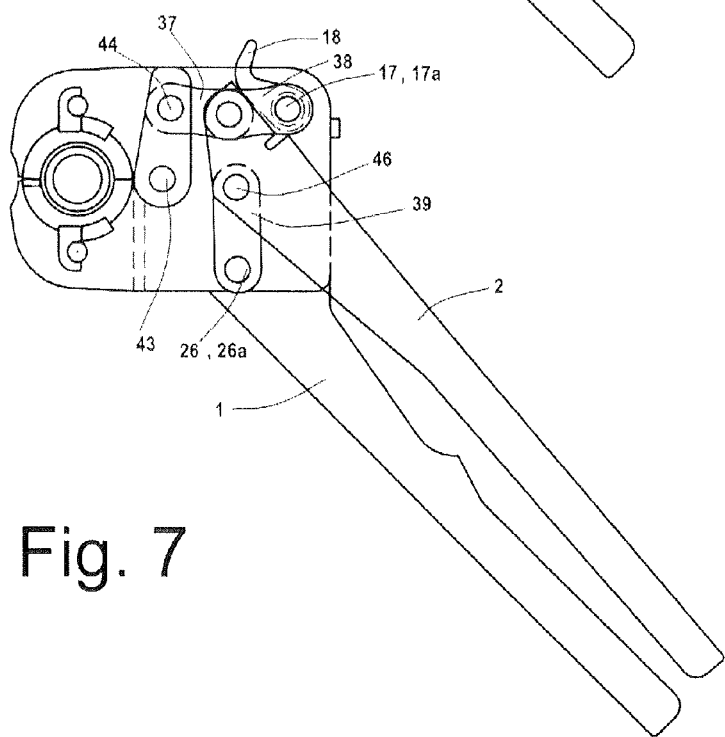
FIG. 7 is a side view of the tool of FIGS. 4A-4B with a side plate removed showing the jaws of the tool closed around the pipe of FIGS. 5 and 6, with compression of the CR ring or SS sleeve complete according to some embodiments of the present invention.

A first embodiment of the present invention is illustrated in FIGS. 5-7. Referring to FIG. 5, the tool 7 is opened fully with the collar halves 5a, 5b in place in the jaws 3, 4 to receive the ring or sleeve 21 for compression or cutting or to release a ring or sleeve 21. The tool 7 contains a linkage assembly including the front push link 37, the back push link 38 and the lower handle link 39. The links 37, 38 and 39 may each include a single piece or two or more link pieces positioned in parallel. As illustrated, the moving jaw 4 is attached to the faces 32 and 33 by the pivot pin 43 and to the linkage assembly at the front push pin 44. The side plates 32 and 33 have three through holes to accommodate the pins 17, 26 and 43 at positions that are selected for the application of a desired jaw force and to ensure that a desired final diameter is achieved within the collar half holes 13 to compress the ring or sleeve 21 within the collar 5 to the desired fit around the pipe 22, or to cut through the ring 21, e.g., when a ring cutting blade is in position. The clamping tips 15 may be integrated at the front of the jaws 3, 4 and are configured for squeezing the clamp on an SSC ring to compress such rings. The clamping tips 15 may also be used to remove the clamped SSC rings.

The lower handle link 39 extends between the handles 1, 2 to allow rotational and lateral movement of the handle 2 with respect to the stationary jaw 3 for opening and closing the moving jaw 4. The handle 1 does not rotate about the axis of the pin 26, and the lower link 39 rotates freely about the pins 26 and 46. The moving handle 2 is pivotally attached at the lower moving handle pin 46 and to the push links 37, 38 at the middle push link pin 45.

The six pins 17, 26, 43, 44, 45 and 46 each allow free rotation of the links 37, 38, 39, moving handle 2 and the moving jaw 4. The jaw pin 43, the lower handle pin 26 and the back cam pin 17a extend through the face plates 32 and 33 and are secured with snap rings, cotter pins, by swaging or through other suitable techniques. The other pins 44, 45 and 46 may be restricted from axial movement by the interior surfaces of the plates 32 and 33.

As shown in FIG. 5, the spring 49 is generally fixed in place about the pin 26 and may provide a forward bias to the lower link 39 so as to move the handle 2 and the jaw 4 toward a closed position.

The collars 5 may determine the final diameter of a compressed ring or sleeve 21 or the cutting depth into and through a ring 21 but may not influence the general tool 7 operation except that the collars 5 for larger rings or sleeves may require adjustment of a lever 18 and cam pin 17a to meet the forces required to complete ring or sleeve 21 compressing or cutting. Therefore, tool motions are essentially the same with the collars 5 removed.

The tool 7 may be sized and configured to provide compactness, lightness of weight, distinctive appearance, balance and/or ease of handling. All parts may be compact to the extent that the length from the end of the handle 2 to the distal tip of the jaws 3, 4 may not exceed 11½ inches. The handles 1, 2 may be shaped to permit additional reach and/or accessibility of the jaws 3, 4 into confined spaces. The profile of the jaws 3, 4 and the side plates of the tool 7 may be reduced while still providing full strength and/or rigidity to increase access, minimize weight and/or provide ease of handling operation. The locations of the links 37, 38 and 39, and pins 17, 26 and 43 may reduce instances when the tool 7 locks up, encounters excess friction and/or provide smooth operation.

Several of the collars 5 may be designed and utilized for CR and SSS compressing for pipes of various sizes, such as sizes up to and including 1 inch pipe diameter or more, and/or for CR ring cutting up through and including 1 inch pipe diameter or more. The half holes 34 defined by the jaws 3, 4, respectively, may have a diameter that is selected to hold all of the compressing collars 5. The diameters of the half holes 34 may be sufficiently large to ensure that even the largest collars 5, for example, for a 1 inch pipe or greater, may be held snugly, while still maintaining a thickness of the collar 5 that is sufficient for collar strength and includes sufficient space for tabs, slots, bars, pins, ball plungers, magnets or any suitable attaching mechanism, including attachment mechanisms known to those of skill in the art. The minimum width of the jaws 3, 4 may be slightly greater than the width of the largest compressing ring or sleeve 21 that will be used with the tool 7.

The collars 5 in the tool 7 may be used to address the wide spectrum of ring or sleeve types and sizes and various types of ring or sleeve compressing and cutting. Therefore, the jaws 3, 4 may further include the removable collars 5 comprising two collar halves 5a and 5b, which are shown held in the jaws 3, 4 by tabs 6 on the jaws 3, 4 and slotted tabs 8 on the collar halves 5a and 5b which may slide onto pins 9 affixed to the jaws 5a and 5b. There may be a tongue 10 and a mating groove 11 on one or both ends of the collars 5a and 5b. The collars 5 may have the outer circumference 12 to snugly fit in the jaws 3, 4 of the tool 7 and may have half-hole 13 with inner radii to compress or cut the ring or sleeve 21 whose outer compressed radius most closely matches the collar 5 inner radius. The collars 5 may be of uniform width side to side to provide an adequate compressed surface to produce sufficient width of the pipe 22 compression onto the fitting 23 to assure a satisfactory water seal for all sizes of pipe and all compression ring or sleeve types. On the other hand, the width of the collars 5 and surface contact with a ring or sleeve may also be minimized, within the limits of the satisfactory sealing, to reduce the force required for compression, with collars which are held securely, axially rotationally and radially for all types of use, handling and storage.

Collars for the tool 7 may also be varied in geometry, for example, to match the differences between SS sleeves and CR ring crimping collars. SS sleeves may have well-defined differences in their ends (which are not compressed) and orientation, in which placement of collars 5 around the sleeves is by an easily observable distance from one end or the other of the sleeves to assure the satisfactory seal by the compression. As another example, for compressing CR copper rings, the collars 5 may be wider than the CR rings which are compressed across their entire width.

The tool 7 of this embodiment may also include the selected collars' inner radii 50 based on copper compression ring 21 (CR) testing and field. Since CR rings compression installation set the standard for flexible pipe seals, the CR testing and performance is herein applied to installation of other types of rings, e.g. SS sleeves. When the same pipe 22 and fittings 23 are used with different types of rings 21 for different compressions, it may be desirable to compress the pipe the same amount for the different compressions, such that the inner diameter of each type of ring or sleeve 21 is reduced to the same diameter at the end of compression. Therefore the collar inner radius may be selected for each size and type of ring to produce the same inner diameter for each type of ring or sleeve corresponding to the desired copper ring compression.

The collars 5 may be designed to be easily and reliably installed and removed from the jaws 3, 4, and in some embodiments, do not necessarily require other holding means such as screws or bolts, clips or other fasteners which may be removable from the tool 7.

The jaws 3, 4 in tool 7 may have a hole centered as far back toward the pivot pin 43 as possible, but still leave enough material in the tool jaws 3, 4 to resist high radial stresses. The jaws 3, 4 may be designed to accept all collars 5 within the confines of the tool geometry that allows final ring 21 compression with one hand. The jaws 3, 4 may have a single diameter hole which will accept even collars 5 connecting the largest pipe size accommodated by tool 7, since the largest pipe cannot be accommodated by the jaw hole itself because different types of rings require a different hole diameter for the largest pipe size to be compressed.

Figure 4:
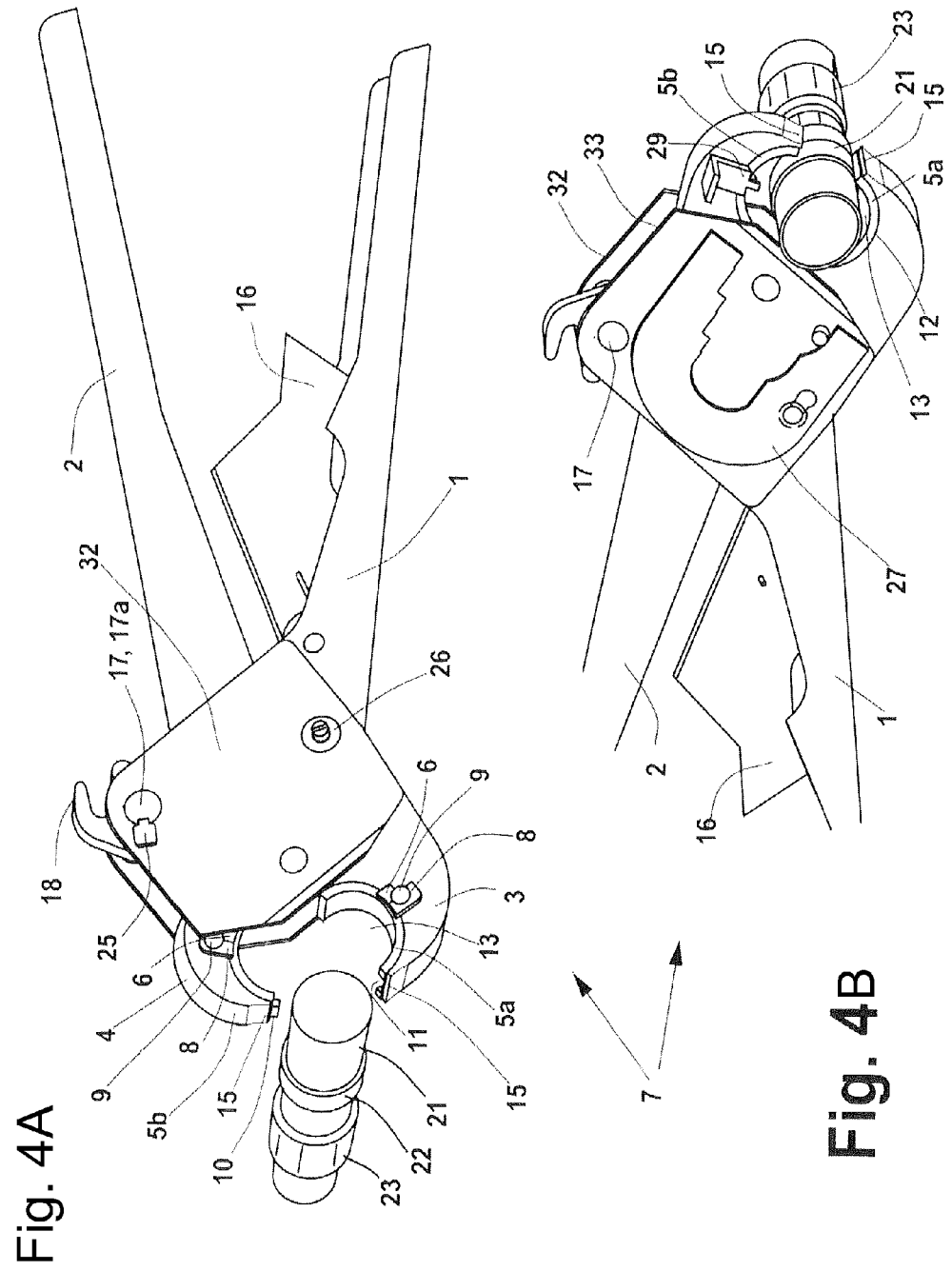
FIGS. 4A-4B are perspective views of two opposite sides of a tool according to some embodiments of the present invention.

Holding attachments for the collars 5, whether on collar 5b or jaw 4, may be able to fit between side plates 32, 33 when the jaws 4 are in a full open position, as shown in FIGS. 4 and 5. Holding attachments are described in further embodiments, below, of this invention.

FIGS. 5, 6 and 7 show the tool 7 mechanical operation when opening and closing to compress CR or SS rings, or to cut a CR ring. As illustrated, the pipe 22 fits over the fitting 23 and the compression ring or sleeve 21 fits over the pipe 22.

The jaws 3, 4 and the collars 5 may be positioned around the ring or sleeve 21 and subsequently closed.

As illustrated in FIGS. 5, 6 and 7, the opening and closing of the jaws 3, 4 may be accomplished by the rotation and translation of the moving handle 2. As shown in FIG. 5 the moving handle 2 is lifted slightly in the direction of the arrow A and the lateral movement of the moving handle 2 in the direction of the arrow B opens the jaws 3, 4 and the collar 5 sufficiently wide to fit around the ring or sleeve 21 in the pipe 22 so that the tool 7 may be properly positioned. A slight gripping force on the handles 1, 2 may be sufficient to hold jaws 3, 4 in the open position. The moving jaw 4 may be prevented from opening too far when the back end of the moving jaw 4 touches the links 38 to limit rotation of the moving jaw 4.

Once the jaws 3, 4 and the collar 5 surround the pipe ring 21 or an ear 53 of the ring clamp 52 (see FIGS. 14, 15, 16), the squeezing pressure is released slightly while maintaining a grip on the handles 1, 2, and the spring 49 (FIG. 5) urges the lower handle link 39, which moves the moving handle 2 in a direction opposite arrow B encloses the jaws 3, 4 to the position illustrated in FIG. 6 in which the two halves of the collar 5 lightly hold the pipe ring 21. FIG. 6 illustrates the positions of the tool 7 parts when the collar 5 is barely touching the ring 21 before the power stroke begins. For using multiple squeezes to compress or cut a ring or sleeve, the force and closure distance adjustment cam 17a and lever 18 may be set to a desired rotational position for the first compression hand squeeze.

Next, the collars 5 may be moved slightly closed further to snugly fit the full circumference of the ring 21, and then the gripping force from one hand of the operator may be applied to the handles 1, 2 to close the tool 7 in the direction opposite the arrow A, and the compressing or cutting of the ring 21 is performed. As the pressure is applied, the front link 37 and the rear link 38 are moved upward away from the pin 26, and as shown in FIG. 6, the collar halves 5a and 5b may be closed with a compressing force which increases as the opening of the jaws 3, 4 decreases. FIG. 7 illustrates the jaws 3, 4 and the collar 5 in the fully closed position.

The ring 21 may be fully cut or compressed with the first stroke or the force and closure distance lever 18 may be reset for a second power stroke, and so on until the proper compression or cut is completed. If the handles 1, 2 are not opened further than the position in which they "spring-back" during the resetting of lever 18, the next one-hand compression squeeze may be initiated as soon as the lever 18 is reset, and the collar 5 may retain its position relative to the ring or sleeve 21 being compressed or the ring being cut. The compression or cut of the ring 21 may be similar to the operation if the compressing or cutting operation were completed in one power stroke with the cam pin 17a and lever 18 at a final position. The moving handle 2 is then rotated away from the fixed handle 1 and moved laterally away from the tool side plates 32, 33, which forces the jaws 3, 4 to open. The gripping pressure may be reapplied to the handles 1, 2 so that the compression cycle may be repeated.

In some embodiments, the movement of the handles 1, 2 is such that one hand may fit around handles for all operations. However, when the handles 1, 2 and the jaws 3, 4 are pulled fully open, the operator may hold the handle 1 with a second hand to improve stability.

Although the tool 7 shown in FIG. 4 is described as accommodating two collar halves 5a and 5b, which are shown held in the jaws 3, 4 by tabs 6 on the jaws 3, 4 and slotted tabs 8 on the collar halves 5a and 5b, which may slide onto pins 9 affixed to the jaws 5a and 5b, it should be understood that the tool 7 may include additional elements and features in various other embodiments as described herein with respect to FIGS. 5-26. Moreover, in some embodiments, the collar halves 5a and 5b may be omitted and the tool 7 may include one or more of the elements and features described in various embodiments described herein. It should be further understood that one or more of the elements and features described herein may be included on the tool 7, alone or in combination with other elements and features. Thus, the tool 7 should be understood to accommodate all the embodiments further described below. The further embodiments include collars with internal circumference centers off set from jaw centers; collars with tongue and groove; collar attachments and geometry for holding collars in jaws; jaw clamping tips for clamping such as SSC rings; collar holders; manually adjusted cam pin for variation of hand force during compression of a flexible pipe ring or sleeve; cutting of the flexible pipe; a movable stop to hold the cam pin in a single position; cutting of compression rings; measuring compressed rings or sleeves; and readjusting and re-calibrating for wear and dimension change of the compression tool mechanisms.

A second embodiment of the present invention is shown in FIG. 8. The general compression tool 7 is essentially the same as the first embodiment described above (FIGS. 4-7), including fixed handle 1, moving handle 2, first and second jaws 3, 4, side plates 32, 33, first, second and third links 37, 38 and 39, pins 17, 26, 43, 44, 45 and 46, and torsion spring 49. In the second embodiment, the collars 5 may be modified to offset the center of the collar internal circumference 56 away from the center of the circumference of the jaws 3, 4 as located by distance Y from the center of pivot pin 43 (see FIG. 8); and toward the pin 43. The offset of the collar internal circumference may be applicable to all collars of the first embodiment to the extent that enough collar material remains between the wall of the internal circumference 57 of the jaws 3, 4 and the internal circumference of the collar to prevent deformation or other damage to the collar during the ring compression or other collar handling. The offset may allow an increase of mechanical advantage by reducing the lever arm from the pivot point 43 to the force vectors against the jaws 3, 4 as imposed by the compression or cutting of a ring or sleeve such that the hand force required for ring or sleeve compression is reduced from that required without the offset. The force reduction may be roughly interpreted as Y/X. For collars with the offset, material may also be removed from areas of collars which have greater distances from the inner radius of the collar inner circumference to the inner circumference 57 of the jaws 3, 4 to an extent that the removal does not allow any deformation or other damage to the collars during compression or other handling of the rings or sleeves.

A third embodiment of the present invention is illustrated in FIGS. 4, 5, 6, 7, 8 and 9. The general compression tool 7 is essentially the same as the first embodiment described above (FIGS. 4-7), including fixed handle 1, moving handle 2, first and second jaws 3, 4, side plates 32, 33 first, second and third links 37, 38 and 39, pins 17, 26, 43, 44, 45 and 46, and torsion spring 49. In the third embodiment, a tongue 10 may be included on one or both ends of a collar half 5a, 5b and a groove 11 to fit around the tongue 10 may be included at corresponding ends of a mating collar half 5a, 5b. The tongue may be an extension of a collar 5b beyond the collar end which mates with the end of a mating collar half 5a. The tongue 10 may be centered side-to-side on the width side-to-side of a collar half end. The tongue 10 may be of a width side-to-side and length top to bottom determined by experiment during ring or sleeve compression to prevent excessive buckling, gathering scraping, or other deformation of ring or sleeve material in the area of mated collar ends. The excessive buckling, gathering scraping, or other deformation may cause inadequate sealing of a flexible pipe after ring or sleeve compression. The length of the tongue 10 up and down may also be shaped at the inner radius of the collar extension to further prevent the excessive buckling, gathering scraping. The tongue shape may be a surface tangent to the inner collar radius where the tongue meets the collar end.

The groove 11 at the mating end of a mating collar half 5*b* may be of dimensions to accept and fit around the tongue at the point of final compression of the compression rings and sleeves with reduced effort. The groove 11 in the mating collar end may have on each side of the groove 11 a corresponding shape of the collar ring inner radius, which may include surfaces tangent to the inner collar radius.

The third embodiment similarly includes the mating collar halves without tongue and groove in which the one or both collar halves are slightly rotated in the jaws 3, 4 toward the front tips of the jaws 3, 4. The degree of rotation is determined by experiment during ring or sleeve compression to prevent excessive buckling, gathering scraping, or other deformation of ring or sleeve material in the area of mated collar ends. The excessive buckling, gathering scraping, or other deformation may cause inadequate sealing of a flexible pipe after ring or sleeve compression. The rotation of the collar halves 5*a*, 5*b* may be effected during the beginning of ring or sleeve rotation by the location of mechanical holders, including tabs, bars, magnets, ball plungers, pins, and the like which hold the collars in the jaws at a fixed or slightly movable position in which the forces of the early stages of ring or sleeve compression do not move the collars rotationally.

The descriptions of this third embodiment should be understood to accommodate other collar modification or location methods for allowing extended or non-extended collar ends to maintain a small enough gap between collar ends during the first stage of collar closure to prevent excessive the buckling, gathering scraping, or other deformation of ring or sleeve material in the area of mated collar ends. The first stage of collar closure is described as the closure on the rings or sleeves such that the ring or sleeve may be deformed but with essentially the same outer ring or sleeve circumference, and the forces of resistance to closure are essentially forces other than those imposed by ring compression.

A fourth embodiment of the present invention is illustrated in FIGS. 9A-9B. The general compression tool 7 is essentially the same as the first embodiment described above (FIGS. 4-7), including fixed handle 1, moving handle 2, first and second jaws 3, 4, side plates 32, 33 first, second and third links 37, 38 and 39, pins 17, 26, 43, 44, 45 and 46, and torsion spring 49. In the fourth embodiment, the collars 5 are passively held axially, rotationally and radially in ring or sleeve compressing position in the jaws 3, 4, whether open or closed, at holding locations on both the tool jaws 3, 4 and collars 5*a*, 5*b*. The holding locations comprise a jaw tab 6 on the same side of each jaw 3, 4, a ping on each jaw and a slotted tab 8 on the collar such that the collar rotationally slides inside the jaw tab and the collar tab slides next to the jaw side surface and fits about the jaw pin. The jaw tabs 6 may have a flat surface tangent to the flat surface of the jaw side such that the collar side touches the flat surface when a collar half is rotated into place. The collar tabs may have a flat surface such that the collars slide along the inner circumference of the jaws 3, 4 and the collar tabs slide along the surface of the jaws 3, 4. In some embodiments for holding collars, the tool 7 may assure a snug axial, radial and rotational fit of the collars in the jaws without any adjustment of holding parts at any holding location. The slot 58 (see FIGS. 9A-9B) of the collar tab 8 may be curved to rotate onto pin 9, thereby creating a friction fit on pin 9 by collar tab. The width of the slot 58 may be narrow enough to hold on the pin 9 and reduce radial motion to the extent that surface friction between the jaw 4 and the collar half 5*b* assists in preventing axial and rotational movement. The slot 58 may belong enough for the open end of the slot 58 to pass the center of the pin 9. The pin 9 on the jaw 4 may be integral to the jaw 4 or permanently fit into the jaw 4. The jaw tab 6 on the jaw 4 may be integral to the jaw 4, and the jaw tabs 6 and the collar tabs 8 may be dimensioned so as to be able to slide inside the side plates 32, 33 when the moving jaw 4 is opened and rotated back between the side plates 32, 33. Further, the pins 9 on the jaw 4 may be magnetized or provide a friction surface to hold the tab 8 by contact. The magnetic pins or pin with friction contact with the inner slot surface may hold collars 5 in place during normal tool 7 uses but allow the operator to rotate the collars 5 out of the jaws 3, 4 with a push of thumb or finger at the end of the collar near the pin location when the jaws 3, 4 are opened.

The descriptions of this fourth embodiment should be understood to accommodate other passive collar placement, holding and removal techniques which may not require active motion or removal of collar holding parts, to include for example press fitting of collars into a jaw with holding rotational and radially only by a collar tab around a jaw pin, or vice versa. The collar 5 may still be removable from the jaw 4 by a push of the fingers; or to include for example, use at different locations of stronger magnets than used with the slotted collar tabs 8. Accordingly, the collars 5 may provide simplicity, relatively small size, ease of installation, relatively low profile, and no interference with tool 7 operation.

A fifth embodiment of the present invention is illustrated in FIGS. 10-13. The general compression tool 7 is essentially the same as the first embodiment described above (FIGS. 4-7), including fixed handle 1, moving handle 2, first and second jaws 3, 4, side plates 32, 33, first, second and third links 37, 38 and 39, pins 17, 26, 43, 44, 45 and 46, and torsion spring 49. This fifth embodiment describes holding of collars in jaws generally by more active devices than in the fourth embodiment. FIGS. 10A-10E show collars without tabs which may be held in jaws 3, 4 by active devices within the inner circumference 57 of the jaws 3, 4. The active device being illustrated is ball plungers which fit into collar slots. As an example of collar types, the collars 80, 81 of FIGS. 10A-10E may also show a slot 81, 82 all around the inner circumference of the collars 80, 81 in order to reduce force required for compressing the ring or sleeve but which still allows a reliable seal of a flexible pipe connection, e.g. for SS sleeves. As illustrated, the collar 81 having two halves a and b includes two slots 83 and detents or grooves 84 in each half. As illustrated in FIG. 11, the jaws 3, 4 may include ball plungers 110 and two bars 111 in each jaw. The two slots 83 may span the width of each half collar 81*a*, 81*b*. The slots 83 and groove 84 of the collars 81 may be configured to cooperatively engage the bars 111 and the ball plungers 110 of the jaws 3, 4. The slots 83 and the bars 111 may be located around the circumferences of the collars 81 and the jaws 3, 4 respectively, where stress effects may be reduced. However, the bars 111 may be located to assure minimal or no rotational and translational motion of the collar 81 away from the inner surfaces 112 and 113, shown in FIG. 11, of the jaws 3, 4 when the jaws 3, 4 are open. The slots 83 of the collars 81 and the bars 111 in the jaws 3, 4 may be of various cross-sectional shapes and may have sufficient lateral contact surface provided between the slots 83 when over the bars 111 to prevent radial movement of the collars 81 during operation of the tool 7. The bars 111 and the slots 83 extend the entire width of the jaws 3, 4 or, in some embodiments as shown in FIGS. 10A-10E, the collar 80, the bars 111 and slots 85 may extend over a partial width to provide sufficient lateral contact. The surface indentations 86 of the collar 80 may act cooperatively with ball plungers 110, and be further supported by the bars 111 and slots 85 to assure reduced or no translational or rotational motion of collar 80 away from the inner surfaces 112 and 113, shown in FIG. 11. Alternatively, the slots 83, 85 may be provided in the jaws 3, 4 with the bars 111 on the collars 80, 81.

The collars 90 illustrated at the bottom of FIGS. 10A-10E show actively held collars with halves 90a, 90b of a type which may be suitable for compressing CR rings 21, and which may use slots 91 and outer radius surface indentations 92 to cooperatively engage the bars 111 and ball plungers 106 of FIG. 11. The slots 91 of the collars 90 and the bars 111 in the jaws 3, 4 may be of various cross-sectional shapes and may have sufficient lateral contact surface provided between the slots 91 when over the bars 111 to prevent radial movement of the collars 90 during operation of the tool 7.

The collars 81, 90 of FIGS. 10A-10E may slide into and out of the jaws 3, 4 of FIG. 11 from either side of the jaws 3, 4 in a direction of the axes of the inner diameters the jaws 3, 4. All the collars 80, 81, 90 have the same outside diameter, which may be slightly smaller than the inner diameter of the jaws 3, 4. The interior of the collars 80, 81, 90 may have an inner diameter that permits compressing and/or cutting of rings for specific pipe size. The collar halves a, b of collars 81, 90 may be interchangeable and placed in from either side of the jaws 3, 4 and may also be switched into either the fixed jaw 3 or the moving jaw 4. In some embodiments, only one bar 111 per collar half a, b is used; however, it should be understood that two or more bars 111 may be used. The collar 90 may be interchangeable and be switched into either the fixed jaw 3 or the moving jaw 4. In some embodiments, only one bar 111 per collar half a, b is used; however, two or more bars 111 may be used.

FIGS. 12A-12D illustrate collars 12Q, 121 each with halves a, b that may be held in jaws 3, 4 without the jaw tab 6 described in the fourth embodiment. The collars 120, 121 as illustrated may be used for all the sizes and types of CR rings and SS sleeves. Collar tabs 121 with the tab hole 122 as shown may fit on pins 9 on the jaws 3, 4 to hold the collars 120a and 120b both rotationally and radially. The collar tabs 124 with a tab pin 112 as shown may fit in holes in the jaws, 3, 4 of the tool, located similarly to the pins 9. FIGS. 13A-13B illustrate a movable latch 130 that may be rotated into a lower position 130a to hold the collars 120, 121 axially and that may rotated to a higher position 130b by moving into a slot 131 cut into the side plate 32 of tool 7. Accordingly, the collars 120, 121 may be installed or removed in some embodiments.

The descriptions of this fifth embodiment should be understood to accommodate other collar placement, holding and removal techniques which may require active motion of collar holding parts, to include, for example, attaching the other tab plates to the sides of the jaws 3, 4, or for example by using snap rings, latches, screw fasteners, or press fit pins at the collar tabs of this embodiment or of previous embodiments.

Figure 14:
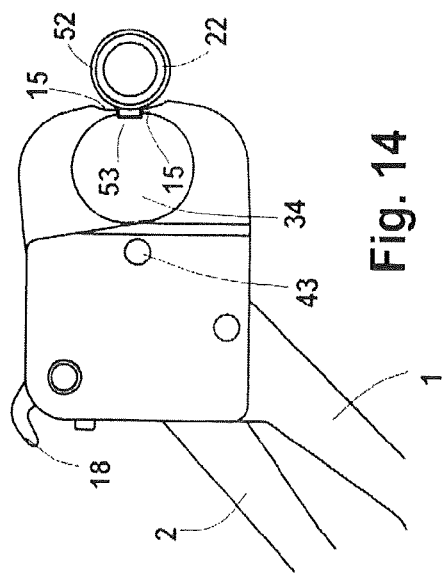
FIG. 14 is an illustration of the tool of FIGS. 4A-4B showing the tool with jaws just touching the ear of an SSC ring prior to compression according to some embodiments of the present invention.
Figure 15:
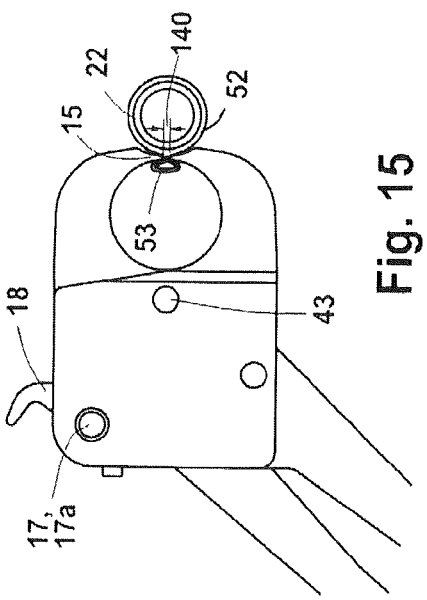
FIG. 15 is an illustration of the tool of FIGS. 4A-4B showing the tool jaws completely closed on the ear of an SSC sleeve after complete compression according to some embodiments of the present invention.

A sixth embodiment of the present invention is illustrated in FIGS. 14-16. The general compression tool 7 is essentially the same as the first embodiment described above (FIGS. 4-7), including fixed handle 1, moving handle 2, first and second jaws 3, 4, side plates 32, 33 first, second and third links 37, 38 and 39, pins 17, 26, 43, 44, 45 and 46, and torsion spring 49. This sixth embodiment describes clamping and removing of SSC and similar rings or sleeves 52. The tool operations may be substantially the same as described in previous embodiments. In this sixth embodiment, the clamping tips 15 at the front of the jaws 3, 4 may be closed onto the clamp ring ear 53 and the handles 1, 2 may be squeezed to clamp the ring or sleeve 52 as shown in FIGS. 14 and 15. For clamping, the clamp tips 15 may be located so as to close to a predetermined closure aperture 140 (FIG. 15) for adequate clamping. On the other hand, the clamp tips 15 may be located at a position sufficiently far from the pivot point 43 of the jaws 3, 4 such that the tips 15 may fit around the clamp ring ear 53 within the normal opening of the tool 7 at the point where the force application begins (FIG. 14) using an opening of the handles 1, 2 that may be readily grasped by an operator. Therefore, the basic mechanisms may be relatively sized and configured such that they may move easily and still apply an adequate force for clamping as well as for ring squeezing and cutting. The clamp tips 15 may not be too sharp such that the tips 15 may cut the clamp ring 52 and ring ear 53, but the tips 15 may be narrow enough to concentrate force at the clamp ring ear 53 to complete a clamping compression. The clamp tips 15 on the jaws 3, 4 may be spaced, such that they do not meet when any of the collars 5 present in the jaws 3, 4 are closed to a final mating position, in order to allow a proper clamp tip opening for first engaging the ring clamp ear 53 but without opening the handles 1, 2 further than required to begin a clamping. This additional gap between the clamping tips 15 may facilitate clamping because the jaws opening for beginning clamping is substantially larger than for beginning compressing of CR rings or SS sleeves. The determination of the gap may facilitate allowing the clamping operation of the tool to duplicate the compressing operation of the tool 7. The clamp tips 13 may operate for all suitable sizes of SSC rings. As seen in FIGS. 14 and 15 and previous figures, an indention may be included in the front of the jaws 3, 4 to allow accommodation of the curvature of the SSC when clamping such that sufficient material may be maintained elsewhere in the front of the jaws 3, 4 to provide sufficient structural strength during ring compression and cutting.

Figure 16A:
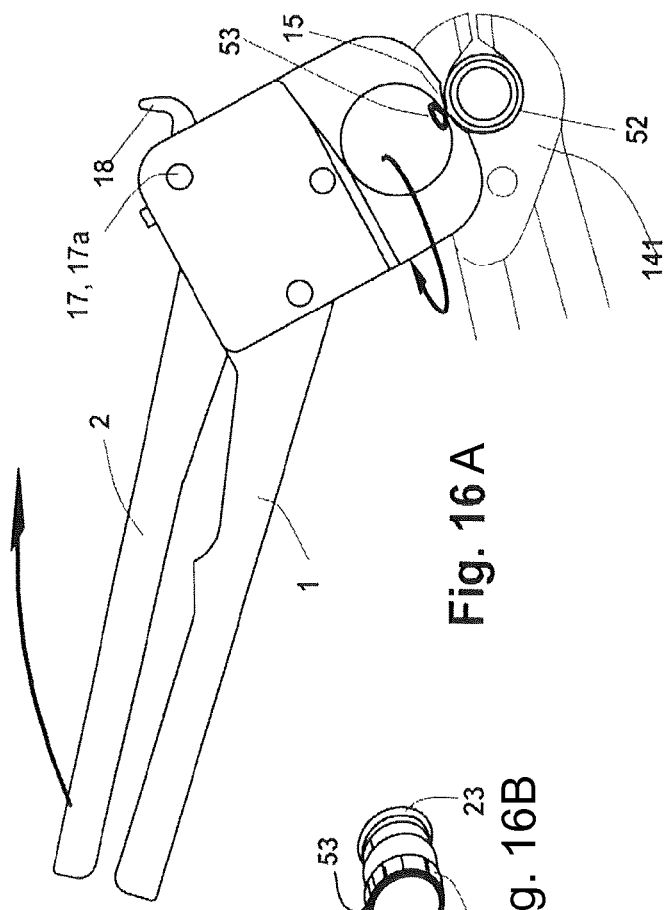
FIGS. 16A-16B show the tool of FIGS. 4A-4B being used to remove a SSC sleeve from a pipe by clamping around the ear of the compressed sleeve according to some embodiments of the present invention.
Figure 16B:
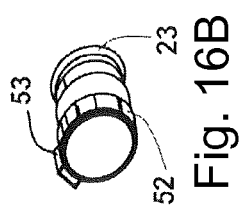

FIGS. 16A-16B illustrate a technique which may be applied for removing an SSC ring 52 using the tool according to this sixth embodiment and an optional supplemental tool 141. As illustrated, the clamping tips 15 may be pressed onto an already compressed clamp ear 53 by closing the handles 1, 2 and the jaws 3, 4 to the fully closed position in which the handles 1, 2 are nearly in contact with one another. The fitting 23 and the pipe 22 are connected to the clamp ring 52 and may be held securely, for example, by hand or by using the supplemental tool 141. As the handles 1, 2 are held firmly together, the handles 1, 2 and the jaws 3, 4 may then be turned or rotated in a direction normal to the side plates 32 and 33 or about an axis normal to the pipe 22 through the clamp ear 53. The direction of rotation is illustrated by the arrows in FIGS. 16A-16B and may be followed by a rotation of the tool 7 in the opposite direction of the arrows in a back-and-forth movement until the compressed clamp ear 53 breaks and the clamp ring 52 can be released and removed. This technique may be used for any suitable size clamp ring, for example, up through 1 inch diameter or greater.

The descriptions of this sixth embodiment should be understood to accommodate other clamp ring 52 clamping techniques which may allow single handed grasping and compression of the clamp rings ears 53 by the tool of the first and second embodiments, in which such tools may or may not have a collar holding capacity.

A seventh embodiment of the present invention is illustrated in FIGS. 17 and 18. The general compression tool 7 is essentially the same as the first embodiment described above (FIGS. 4-7), including fixed handle 1, moving handle 2, first and second jaws 3, 4, side plates 32, 33, first, second and third links 37, 38 and 39, pins 17, 26, 43, 44, 45 and 46, and torsion spring 49. This seventh embodiment describes collars holders 150, 160, in which the collar tabs 8 or the surfaces of collar halves a, b may be employed to affix the collars into the collar holder, and the collars of previous and subsequent embodiments may be readily carried and accessible. Collar holders 150, 160 may augment the multi-functionality of the tool of the first embodiment.

FIGS. 17A-17E show a collar holder 150 in which the collar half 5a, 5b tab slots 58 described in the fourth embodiment may fit onto a first bar or cylinder 151 on the collar holder 150, with the slotted tab end touching a second bar 140. The collar tabs 8 may be further held by a strap 153 moved into position at the collar tab surface opposite the tab slot 58. The strap 153 may lock into the tab 8 securing position by catching on a small protrusion 157 on the second bar. The strap 153 may hold closely on the tabs 8 to prevent tab 8 sliding or rotation.

The first bar or cylinder 151 may have slots on the surface so that each collar tab 8 is specifically located along the axis of the first bar or cylinder. The first bar or cylinder may be compliant, e.g. a hard polymer, to allow tabs to snap on easily. The holder 150 may accommodate two to four collar halves 5a, 5b or may be extended to hold up to ten collar halves 5a, 5b or more, or the holders may be ganged together radially or longitudinally. The collar holder may occupy less than 1/10 of the volumes occupied by the collars.

FIGS. 18A-18C illustrate a collar holder 160 for multiple collars 80, 90 without tabs, like those shown in FIGS. 10A-10E. The half tube 161 may hold the collars. The tube 162 surrounds the tube 161, has an opening 163 and may be rotated about tube 161 to expose or enclose the collars. Both the tubes 161 and 162 may have a narrow slot 164 opposite the openings 163 for the collars to be installed into and extracted from the holder 160. This narrow slot 164 may be used to push a selected collar 80, 90 out of the collar holder 160 opening 163. The tube 161 may also translate along the tube 162 to allow more or less axial interior length to provide for more or fewer collars 80, 90.

The smallest tube size 165 may be used in short sections, which act as stops at each end of the holder 160. At one end of the holder 160, the tube 165 may extend beyond the tube 146 stop so that a collar 80, 90 can be held at that end. This may allow two collar halves a, b to be held at the end of the carrying case 160 so that the collar halves a, b may be installed together into the jaws 3, 4. At the other end of the case 160, the tube 165 may extend a distance beyond tubes 161 and 162 so that the tube 165 extension can be used to push simultaneously two collar halves a, b out of jaws 3, 4. Thus, the holder 160 may also serve as an installation and removal implement for the collars.

The holder 160 may be extendable to hold more collars of the type represented by 80, 90 and may be simply fabricated from three sizes of plastic pipe, and may weigh less than 0.1 pound.

The holders 150 and 160 may be carried in a pocket, on the base tool of the first embodiment, or on a belt. A small magnet for locating and picking up dropped collars 5, 80, or 90, may be included with the holders 150, 160.

The descriptions of this seventh embodiment should be understood to accommodate other collar holders in which the collar tabs or collar surfaces may be employed to affix the collars into a collar holder, the collar holder allows simple insertion and extraction of collars, and the collar holder may be carried in a trouser pocket or on a belt.

An eighth embodiment of the present invention is illustrated in FIGS. 19 and 20. The general compression tool 7 is essentially the same as the first embodiment described above (FIGS. 4-7), including fixed handle 1, moving handle 2, first and second jaws 3, 4, side plates 32, 33, first, second and third links 37, 38, 39, pins 17, 26, 43, 44, 45 and 46, and torsion spring 49. In this eighth embodiment, a cam pin 17a may be located at the pivot location 17 on the tool 7, and the cam 17a may allow variation of the force of the hand of a tool operator required for ring or sleeve 21 compression or ring cutting. The surface 170 radius of the cam 17a centered between the ends of the pin 17 may increase from a minimum eccentricity to a maximum eccentricity over a rotation of 180 degrees, as shown in FIG. 19A-19D. For a given moving handle 2 position, rotation of the cam 17a may translate the link 38 and the link 37 toward the front of the tool 7 to further close the jaws 3, 4 and by opposite rotation may translate the link 37 and the link 38 toward the back of the tool 7 to further open the jaws 3, 4. The cam 17a may be rotated manually, such as with an extension or lever 18, to allow multiple squeezes together of the handles 1, 2 with corresponding progressive jaw closures to a final cam 17a position D to complete the compression of the compressions rings or sleeves 21. The manually selected cam 17a position from full back position C to full forward position D and any intervening position between C and D may locate the fixed 1 and moving handles 2 opening to a comfortable position for the tool operator's hand to complete a squeeze together of the handles 1, 2.

As illustrated in FIGS. 19A-19D, the cam 17a may rotate with a lever 18, for example, by using a keyway and bar or flat portion on both the cam pin 17a and the lever 18 or other mechanical engagement mechanisms (not shown) to engage and lock the pin 17a and the lever 18 together. The cam portion 170 of the pin 17a rotates within the back hole 171 in the link 38. When the lever 18 is rotated fully back (position C), the link 38 is urged toward the back of the tool 7 through a cam eccentric distance E and back from its position where the lever 18 is rotated fully forward (position D). All of the positions of the lever between the position C and the position D may result in corresponding relative motions of the link 38.

The cam 17a may be held axially by, for example, a clip on the small end 173 of the pin 17 at one of the tool side plates 33 and held by the internal links 38 and lever 18 against the largest diameter head 174 of the pin 17 at the other side plate 32.

The manually operated cam 17a may control multiple stroke operations of the tool 35 to permit complete compressing, for example, of larger rings or sleeves 21, or for example, when the operator's squeezing hand may be moved forward on the handles toward the back of the tool 7.

In some embodiments, such as for smaller pipe sizes, such as a half inch pipes diameter or less, the lever 18 may be sent to the fully forward position for the final compressing or cutting operation and a compressed or cut operation may be completed with a single hand squeeze of the handles 1, 2.

For compressing or cutting rings on larger sizes of pipe 22, such as a 1 inch pipe or greater, the force of the hand closing over the hand closure squeezing distance (from a position where the fingers are almost fully extended to a position where the fingers are almost fully closed) may not be sufficient to complete a compression for any or all of the different ring or sleeve 21 types shown in FIG. 1. The force inadequacy may also occur for clamping of clamp rings 52, where the jaws 3, 4 may need to be especially wide open to grasp the clamp ring ear 53. Therefore, to complete a compressed or cutting operation, multiple hand closures and compressing cycles may be used. If there are successive compressing/cutting power strokes, the hand pressure may be released after each stroke and the lever set forward for the next stroke.

Before each handle closure to further compress or cut a ring, the cam 17a may be set in a position in which the related positions of links 37 and 38 influence the moving handle 2 to a position that is comfortable for an open hand grip (e.g., 4 to 4½ inch opening between the back ends of the handles 1, 2). The final setting of the lever 18 may be nearly fully forward as illustrated in FIGS. 20A-20B or near position D in FIGS. 19A-19D.

As illustrated in FIGS. 7, 15 and 25B, when the ring 21 compressing or cutting operation is completed, the diameter of the corn pressed ring 21 will be less (or the cut through for the ring 21 will be deeper) when the maximum cam eccentric 17a and lever 18 are is positioned more toward the forward position D. Therefore, the final compressed diameter or depth of cut for a ring 21 may be determined by both the position of the lever 18 and the internal diameter of the collar 5 or jaw 4 that is used for the compressing or cutting operation. The height of the cutting blade 220 (see FIG. 25A) may be essentially unchanged from one size ring 21 to the next. For meeting a desired compressed diameter or cutting depth for the collars 5, which may be provided as attachments to the tool, the position of the lever 18 prior to the final compression or cutting stroke may be calibrated. In some embodiments, markings 176 (e.g., visual markings such as "Start" and "Finish") may be provided to indicate calibrated positions, for example, on a side plate 32 as illustrated in FIGS. 20A-20B.

The inside diameter of a collar 5 may be designed such that the final compression of the ring or sleeve or cut of the ring 21 may be completed when the lever 18 is set nearly full fully forward, such as is shown in the bottom position shown in FIGS. 20A-20B. The hand force for compressing may be dependent upon the degree to which the diameter of the ring or sleeve 21 is decreased, such that successive decreases in the diameter of the ring or sleeve 21, for example, due to compressing forces, may mean less hand force per compressing stroke if the diameters are decreased successively and steps. In some embodiments, successive cutting strokes for cutting a ring 21 may also reduce the hand force required for each successive stroke.

For compressing and cutting operations of the ring 21, the cam 17a and lever 18 may be set first when the jaws 3, 4 are closed to the position shown in FIG. 6 and FIG. 14 such that the collar 5 contacts the ring 21 without substantial force or the tips 15 contact the ear 53 without substantial force just prior to completing the compressing/cutting power stroke.

The descriptions of this eighth embodiment should be understood to accommodate other manually operated cams and levers of various diameters and eccentricities, manual cam rotation by levers in other locations or with an extension of the pin 17, manually operated cams of different eccentric surfaces, and other devices for successively translating the links 37 and 38 together to successively moving the moving jaw 4.

A ninth embodiment of the present invention is illustrated in FIGS. 21A-21D. The general compression tool 7 is essentially the same as the first embodiment described above (FIGS. 4-7), including fixed handle 1, moving handle 2, first and second jaws 3, 4, side plates 32, 33, first, second and third links 37, 38, 39, pins 17, 26, 43, 44, 45 and 46, and torsion spring 49. This ninth embodiment describes a movable stop 180, a friction stop (not shown), or a ball plunger (not shown) attached to the tool for holding the cam 17a described in the eighth embodiment, in which the cam 17a is held in a single rotational position when multiple positions and resulting successive manual squeezing forces are not required for successive ring or sleeve 21 compression or cutting. Specifically, the cam 17a may be held in the final ring compressing or cutting position D with the maximum cam radius 170 forward (position D, FIGS. 19A-19D) whenever the compression or cutting may be accomplished with a single hand squeeze on handles 1, 2. The stop 180 also serves to eliminate free movement of the first cam 17a caused by friction from the link 38 rotating about the cam 17a during opening and closing of the handles 1, 2. A stop 180 using a ball plunger would have the ball plunger in the cam pin 17 and a slot in the cam pin 17 hole in side plate 32.

The stop 180 shown in FIGS. 21A-21D may include a top plate 181 that may be manually pushed to translate along the outer surface of the side plate 32, a bottom plate 182 to translate along the inner surface of the side plate 32, a stop bar 183, and a slide bar 184. The side plate 32 may have a first through slot 185 connecting with the hole 171 (FIGS. 19A-19D) for the pivot location 17 in the side plate 32, and the end of the pin 174 with the cam 17a may have a second slot 186 axially from the end of the pin 17 of a length to accommodate the length of the stop bar 183, and of a width to least fit about the bar 183 of the stop 180.

When the cam 17a is to be held at a rotational position, such as the position of final compressing, the second slot 186 may be aligned with bar 183 on stop 180, and the stop top 181 may be pushed with bar 183 sliding in first slot 185 so that the bar 183 may engage within the second slot 186. When cam rotation is desired, the bar 183 is disengaged from slot 186 by opposite sliding of the stop top 181 to that just described, and the cam 17a may be rotated to another position selected for ring 21 compression or cutting. The stop 180 may be biased to the non-stopping position, for example, by a spring of by higher sliding friction at the non-stopping position.

The descriptions of this ninth embodiment should be understood to accommodate other stops for the cam 17a in which a stop may be rotated into or out of holding position, a stop may be affixed to the tool at other locations and by other parts, a stop may engage the pin 17 by other means than the described bar 183 and slot 186, and/or the cam may be stopped at multiple rotational positions.

A tenth embodiment of the present invention is illustrated in FIGS. 22A-22B. The general compression tool 7 is essentially the same as the first embodiment described above (FIGS. 4-7), including fixed handle 1, moving handle 2, first and second jaws 3, 4, side plates 32, first, second and third links 37, 38, 39, pins 17, 26, 43, 44, 45 and 46, and torsion spring 49. This tenth embodiment describes an adjustment assembly 190 which may compensate for wear of parts in the tool 7 and may re-calibrate final circumference of a compressed ring or sleeve 21. A second cam 26a may be located at the pin 26 such that the second cam 26a can be rotated to translate the link 39 (FIG. 6) and the moving handle 2 and the pins 45 and 46 to change the distance between the pins 17 and 44. The second cam 26a may be held rotationally by a fixed, second rotation stop 192 on the side plate 32 and into the hole in the side plate 32 for the pin 26, and the pin 26, which holds the second cam 26a may have one or more slots 194 in the end of the pin 26 such that the any of the slots 194 may engage the fixed, second stop 192. The slots 194 may be disengaged from the fixed, second rotation stop 192 by moving the pin 26 holding the second cam 26a axially, and orthogonally into side plate 32, to release the stop 192 from around the slot 194. Any of the slots 194 may be re-engaged by rotating the cam 26a to align a next slot 194 with the fixed, second stop 192, and by moving the pin 26 holding the second cam 26a axially, and orthogonally into the side plate 32 to engage the fixed, second stop 192 with the slot 194. The pin 26 holding the fixed, second cam 26a may be axially biased to the engaged stop position, or toward the outside of the side plate 32, for example, by a biasing member, such as a spring washer 196 held by a pin clip 197 as shown in FIGS. 22A-22B. The pin 26 holding the second cam 26a may be moved axially and rotated by several readily available techniques such as a flat screwdriver of suitable size, by a coin, finger and thumb or fingernail.

The adjustment assembly 190 may therefore be utilized for wear on tool 7 mechanisms. Under the present embodiment, the adjustment for wear may be accomplished without removing any parts from the tool 7 and without using any special tool supplied for effecting the adjustment. Wear on surfaces of all links, pins, and the side plates 32, 33 and jaws 3, 4 tends to slightly reduce the closure of the jaws 3, 4 as the handles 1, 2 are closed, and therefore the final compressed circumferences of compressed rings 21 are increased for successive compressions. Therefore, the maximum eccentric surface 198 of the second cam 26a may be rotated toward the top of the tool 7 and locked into place as described above to translate link 39 upward and further increase the distance between the pins 17 and 44. The increase of distance may cause the jaws 3, 4 to close more completely when the handles 1, 2 are closed for a final compression. The cam 26a may be rotated to increase jaws 3, 4 closure when it is observed that compressed ring 21 circumferences are beginning to approach upper specified limits. The multiple slots 194 may allow several re-calibrations of the tool 7 for wear over long periods of successive ring compressions.

The tenth embodiment should be understood to accommodate other possible locations of the second cam 26a, such as at the pin 44 location, the use of the first cam 17a to compensate for wear in which the eccentricity of the first cam 17a may be increased, the relocations of the biasing member (e.g., the spring washer 196) to the other side of the tool 7, and compensation for wear by parts replacement, including replacement of the first cam 17a.

An eleventh embodiment of the present invention is illustrated in FIGS. 23A-23E. The general compression tool 7 is essentially the same as the first embodiment described above (FIGS. 4-7), including fixed handle 1, moving handle 2, first and second jaws 3, 4, side plates 32, 33 first, second and third links 37, 38, 39, pins 17, 26, 43, 44, 45 and 46, and torsion spring 49. This eleventh embodiment describes flexible pipe cutting using the tool land comprising a cutting blade 200 which may be pivotally attached to the tool 7 at a pin 202 such that the cutting blade 200 moves between the two handles 1, 2. The cutting blade 200 may be biased by a torsion spring 203 to a neutral position 204 with the sharp edge 205 of the cutting blade 200 held inside the fixed handle 1. The cutting blade 200 may be neutrally positioned to avoid inadvertent operator exposure to the sharp edge 205 but high enough in handle 1 such that an angled end 206 of the blade may be exposed to engage a section of pipe 22 inserted between the two handles 1, 2. The cutting blade 200 may be moved upward rotationally away from handle 1 to a pipe 22 cutting position by sliding a flexible pipe 22 between the two handles 1, 2 toward the tool side plates 32, 33 such that the pipe 22 pushes against the angled end 206 opposite the end of pivot pin 202 (FIG. 23A) to push the cutting blade 200 away from the fixed handle 1. When the pipe 22 reaches a holding shape position 207 on the inside of the fixed handle 1, the top of the cutting blade 200 touches the moving first handle 2, at a location in which the moving and fixed handles 1, 2 may be comfortably grasped by a tool operator's single hand to begin closing of the handles 1, 2 and cutting of the pipe 22 (FIG. 23D). The handles 1, 2 may be squeezed closed to push the cutting blade 200 and sharp edge 205 through the pipe 22 to cut the pipe 22, and the pipe 22 may be cut by a single squeeze of a single hand. In some embodiments, the cutting blade 200 does not inhibit movement of the moving handle 2 except from resistive force by the pipe 22 during cutting or by the biasing torsion spring 203 force to the neutral position, such as when the moving and fixed handles 1, 2 may be fully closed. Cutting of the pipe 22 maybe completed as or before the downwardly rotating moving handle 2 touches the pipe 22. The blade surface 208 that touches the moving handle 2 may translate along the inside of the moving handle 2 as the handle 2 is closed during a cutting operation or as the handle 2 is opened. The cutting blade 200 may open and close to cut pipe 22 as large as pipe size 1 inch or greater and as small as pipe size ⅜ inch or smaller. The moving handle 2 shape or curvature may also serve to stabilize the blade 200 laterally and flexing of the blade 200 may be reduced by force being transmitted to the blade near the middle 208 of the blade 200.

The pivot pin 202 may be located in the fixed handle 1. The fixed handle shape 207 for holding the pipe 22 during cutting may not cause any interference with other tool operations.

The descriptions of this eleventh embodiment should be understood to accommodate cuttings blades moving between the handles 1, 2 of the tool, for example, in which a cutting blade may be pivoted about a pin further toward the back end of the fixed handle 1, and the cutting blade is still pushed by the moving handle 2 but rotates in the opposite rotational direction relative to the rotation of the moving handle 2.

A twelfth embodiment of the present invention is illustrated in FIGS. 24A-24F. The general compression tool 7 is essentially the same as the first embodiment described above (FIGS. 4-7), including fixed handle 1, moving handle 2, first and second jaws 3, 4, side plates 32, 33, first, second and third links 37, 38, 39, pins 17, 26, 43, 44, 45 and 46, and torsion spring 49. This twelfth embodiment describes the cutting of flexible pipe 22 by a cutting apparatus which may be removably attached to the tool 7 and comprising a cutting blade 210 for cutting of flexible pipe 22. The cutting blade 210 may be pivotally and movably connected (FIG. 24E) by a first pin 212 to a first collar half 213 (FIG. 24F) which may be placed in the moving jaw 4. The second pin 215 at the distal end of the cutting blade 210 may rest in a pin holding location 216 which is part of a second collar half 217 (FIG. 24D). The collar halves 213 and 217 may be attached in the jaws 3, 4 by a collar attachment (not shown), such as is described in the fourth and fifth embodiments above.

A flexible pipe 22 may be placed in the second collar half 217, with the moving and fixed jaws 3, 4 open to accept the pipe 22 (FIG. 24A). The handles 1, 2 (not shown) and the jaws 3, 4 may be closed such that the second pin 215 on the cutting blade 210 may be moved into the holding location 216 on the second collar half 217 (FIG. 24B) and the first pin 212 may be pushed by the first collar half 213 to push on the slot 218 in the cutting blade 210 to push the cutting blade 210 through the flexible pipe 22 until the handles 1, 2 and jaws 3, 4 may be closed and the pipe 22 cut is complete (FIG. 24C).

The cutting blade 210 may be offset from the side of the jaws 3, 4 by the extension and a shoulder of the first pin 212 on the first collar half 213, and the pipe cutting may occur to the side of jaws 3, 4. The first and second collars 213, 217 may extend axially to the opposite side of or through the jaws 3, 4 to provide stability during cutting. The cutting blade 210 may be biased to move toward closure on the pipe 22 during initiation of pipe cutting.

A thirteenth embodiment of the present invention is illustrated in FIGS. 25A-25B. The general compression tool 7 is essentially the same as the first embodiment described above (FIGS. 4-7), including fixed handle 1, moving handle 2, first and second jaws 3, 4, side plates 32, 33, first, second and third links 37, 38, 39, pins 17, 26, 43, 44, 45 and 46, and torsion spring 49. This thirteenth embodiment describes cutting of compressed rings 22, CR rings for example, to be removed from flexible pipe connections by a ring cutter 220 removably attached to collars 5 or jaws 3, 4, and the cutter 220 comprises a cutting edge 221 and holding ends 222. The cutting edge may be affixed in one of the jaws 3, 4 or one of the collars 5 in the tool 7 by pressing the holding ends 222 onto the sides of the jaw 3, 4 or the collars 5, and the second slots 223 in the tabs 8 on the collars 5 may also be construed as a side. One holding end 221 may be expanded to a fixture 224 for grasping by the tool 7 operator when installing the cutter 220 in the jaws 3, 4 or collars 5, when removing the cutter 220 and/or when cutting the ring 22.

For cutting a ring 22 with collars 5 or jaws 3, 4, the inner diameter of the collars 5 or jaws 3, 4 may be that used when compressing a ring 22 of the same size. For cutting a ring 22, the handles 1, 2 (not shown) and jaws 3, 4 (only top moving jaw 4 shown) may be opened to accept the pipe 22 and compressed ring 22. When the ring 22 is placed in the bottom jaw 4, the cutting edge 221 and holding ends 222 may be affixed to the top jaw or collar half 5b by fitting the holding ends 222 to the jaw 3 or collar half 5b sides. The jaws 3, 4 may be closed until the cutting edge 221 touches the ring 22 and the jaws 3, 4 may be closed together until the cutting blade 221 touches the ring 21 (FIG. 25A) and the vertical axis of the cutting blade 221 is aligned toward the center of the ring 21 being cut. A single hand squeeze of the handles 1, 2 may further close the jaws 3, 4 until the cutting blade 221 is pushed through the ring 21 and the ring 21 touches the top of the jaw 3 or collar half 5b (FIG. 25B). The jaws 3, 4 may be opened and the cut ring 21, and pipe 22 (around a fitting 23), and cutting blade 221 and holding ends 222 removed.

Therefore, the tool 7 operation for CR ring 21 cutting may be substantially the same as that described above for ring 21 compressing. A single squeeze of the handles 1, 2 may complete the ring 21 cut. If desired, after cutting, the jaws 3, 4 may be slightly opened, and the clamp tips 15 may be closed on the loose cut ring 21, and the ring 21 may be pulled away from the pipe 22.

The cutting blade 221 may extend across the width of the half collar 5b, i.e., substantially the width of the jaws 3, 4. Therefore, the blade 221 may cut entirely across the width of the ring 21. The geometry of the ring cutting blade 221 may be designed and/or tested with various ring sizes to assure a complete cut, but with minimal penetration into the pipe 22 in order to preserve the integrity of the fitting 23 inside the pipe 22. The blade 221 angle may be just sharp enough to cut but not too sharp to allow flexure or breakage of the cutting blade.

The cutting blades 221 and holding ends 222 may be of high strength, high hardness steel to withstand the resistive force of the ring being cut; The cutting blade 221 may be affixed in the collar 5b or jaw 4 such that the resistive force is distributed across the entire length and width of the cutting blade 221 and thus transferred to the holding collar 5 or jaw 3. Cutting blades 221 and holder ends 222 may be held in a slot (not shown) of the collar holders 150, 160 described in the seventh embodiment.

A fourteenth embodiment of the present invention is illustrated in FIGS. 26A-26B. The general compression tool 7 is essentially the same as the first embodiment described above (FIGS. 4-7), including fixed handle 1, moving handle 2, first and second jaws 3, 4, side plates 32, 33 first, second and third links 37, 38 and 39, pins 17, 26, 43, 44, 45 and 46, and torsion spring 49. This fourteenth embodiment describes a "go nogo" gauge 27 removably attached to the tool 7, in which the "go no-go" gauge may include an opening having a plurality of inner diameters accessed by a single opening and configured to measure corresponding diameters of compressed rings or sleeves for different pipe size connections. Although the gauge 27 is illustrated as a "go no-go" gauge for compressed ring sizes 1 inch, ¾ inch and ½ inch, represented respectively in the drawing by diameters 230, 231 and 232, it should be understood that the gauge 27 may be configured for any suitably sized compression rings or sleeves. Unlike prior art "go no-go" gauges, which generally require six separate slots in a flat plate, the gauge 27 may be a three in one "snap gauge" with a single slot that has progressively different widths and is designed to fit within the boundaries of the side plate 33, for example, substantially flat against the side plate 33, to reduce the overall tool profile. Attachment elements such as 234 and 235 may be provided for holding the gauge 27 when not in use. These attachment elements 234 and 235 may be a pin and slot, press pins, clips or other suitable attachment element. Because the gauge 27 is readily removable from the tool side plate 33 and easily accessible to the user, the probability that the gauge 27 will be used by an operator after every compression may be increased due to the accessibility of the gauge. The compressed ring or sleeve 21 may be checked by pressing the "go" slot of the "go no-go" gauge 27 over the compressed ring or sleeve 230, 231 or 232. As shown in FIGS. 26A-26B, different sizes of rings or sleeves 21 may be enter the single slot. If the proper "go" section, as illustrated by the "go" opening 237 for a 1 inch ring, in the gauge 27 fits over the circumference of the ring or sleeve 230, 231 or 232 and the "no-go" portion of the slot, as illustrated by the "no-go" opening 238 for a 1 inch ring in the gauge 27, will not fit over the ring or sleeve 230, 231 or 232, then the connection is considered within acceptable tolerance levels. Subsequent ring sizes ¾ inch and ½ inch can be gauged by following the same procedure using the appropriate "go" and "no-go" steps in the access opening of the gauge 27.

The descriptions of the embodiments demonstrate how a multi-functional tool for installing and removing flexible pipe may be designed to incorporate practically all functions required for such installation and removal. Accordingly, the need for multiple tools for different pipe sizes and compressing ring or sleeve types may be reduced, presenting the operator less bulk, and better access and ease of operation. It has been estimated that total cost, mass and volume reduction of more than 85% may be reached with the multi-functional tool. The multi-functional tool mechanisms, geometry and adjustment for allowing multiple hand squeezes result in a capability for completing all compressing and cutting with the squeezing of an operator's single hand. Tool access for tight places may be greatly improved, especially by avoiding wide opening of handles to fit over rings or sleeves and onto clamp ears. Compression and cutting calibrations may be readjusted to compensate for wear of tool parts. Compression collars for a wide range of compression ring sizes and types may be small, easily installed and removed, and securely held in the tool for all operations. Pipe cutting and ring cutting are accomplished in the multi-functional tool as a single unit or with attachment of small, convenient, reliable parts. A more convenient gauge for ring measurement and holders for collars may assure more expedient tool use, which improves the reliability of flexible pipe installation. Cutting edges, clamping tips, and compressing surfaces may be included without unnecessarily exposed sharp surfaces or pinching. The tools according to some embodiments may be rugged and robustly constructed for in-the-field operation. Various modifications may be made to extend the multi-functional tool application to pipe sizes larger than one inch.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A compression tool comprising:
a first jaw member;
a second jaw member pivotally connected to the first jaw member at a first pivot location;
a first handle connected to the second jaw member; a second handle connected to the first jaw member; wherein the first and second jaws are configured to move between an open position and a closed position to thereby connect flexible pipe by compressing flexible pipe connecting rings or sleeves;
a plurality of collars having two or more associated circumferences for compressing of different sizes and different types of rings or sleeves, each of the plurality of collars comprising a first collar portion that is removably attached to the first jaw member and a second collar portion that is removably attached to the second jaw member, wherein movement of the first and second jaw members, together with attached collar portions, between the open position and the closed position around a pipe connecting ring or sleeve reduces a circumference of the pipe connecting ring or sleeve thereby providing a pipe connection seal, and wherein the closure of a single hand around both the first and second handles closes the first and second jaws and collar portions to reduce the original ring or sleeve circumference to a circumference providing a flexible pipe connection seal; and
collar holding locations comprising respective jaw tabs on a side of each of the first and second jaw members, respective jaw holders on the first and second jaw members, and respective cooperating slotted collar tabs on the first and second collar portions of the plurality of collars, wherein the first and second collar portions are configured to rotationally slide inside the jaw tabs such that the collar tabs are slidably received next to the sides of each of the first and second jaw members.

2. The tool of claim 1, further comprising:
a first link pivotally connected to the second jaw member at a second pivot location;
a second link pivotally connected to the first link at a third pivot location and pivotally connected to the first jaw member at a fourth pivot location;
wherein the first handle is a moving handle attached to the third pivot location, the second handle is a fixed handle rigidly connected to the first jaw member, the first jaw member is a fixed jaw member and the second jaw member is a moving jaw member that is configured to move together with the first handle;
a third link pivotally connected to the first handle at a fifth pivot location and pivotally connected at an opposite second end thereof to the first jaw member at a sixth fixed pivot location;
a first biasing member configured to bias the third link so as to move the first handle and the second handle and the first jaw and the second jaw toward the closed position;
wherein, closing the first handle toward the second handle drives the first and second links through the third pivot location to rotate the second jaw member about the first pivot location in a first rotational direction, to rotate the first link in the first rotational direction, to rotate the second link in a second, opposite, rotational direction, and to rotate the third link in the first rotational direction about the sixth pivot location, to thereby move the first and second jaw members to the closed position;
wherein the jaws are configured to be opened to accept rings or sleeves for compression by pulling the first moving handle back away translationally from the first pivot location and rotationally about the third and fifth pivot locations; and
wherein the first moving handle is configured to maintain the first and second jaw members in the open position, the closed position and one or more intermediate positions between the open position and the closed position.

3. The tool of claim 2, wherein the first and second jaws have an opening of one size to enclose the plurality of collars, and the first and second collar portions of the plurality of collars each define a different diameter and ring or sleeve contact surfaces having a width and inner radius that is sized to form flexible pipe connection seals by single-handed compression from an original ring or sleeve circumference to a final compressed ring or sleeve circumference.

4. The tool of claim 3, wherein ones of the plurality of collars define a center of an inner circumference thereof that is offset from a center of an inner circumference of the first and second jaw members in a direction toward the first pivot location to thereby provide mechanical advantage during ring or sleeve compression.

5. The tool of claim 3, wherein one of the first and second collar portions comprises a tongue and another one of the first and second collar portions comprises a groove that mates with the tongue at corresponding ends of the other one of the first and second collar portions such that the first and second collar portions more extensively encircle a compression ring or sleeve during engagement of the ring or sleeve by first and second collar portions wherein ring or sleeve circumference length is maintained.

6. The tool of claim 2, further comprising a cutting blade configured to cut pipe, the cutting blade being attached at a seventh pivot position such that the cutting blade moves between the first and second handles and is biased to a neutral position such that a sharp edge of the cutting blade is held inside the second handle of the tool and the cutting blade is movable between a stowed position and a pipe cutting position by sliding a pipe between the first and second handles and against the cutting blade end opposite the seventh pivot position to push the cutting blade away from the second handle until the until the pipe is held in position on an interior side of the second handle so that the cutting blade contacts the first handle, wherein when the first and second handles are moved to the position where the first handle touches the pipe, the cutting blade is configured to be positioned through a pipe between the first and second handles to thereby cut the pipe.

7. The tool of claim 6, wherein the cutting blade and first and second handles are sized and configured to move using single hand operation to cut the pipe and the cutting blade does not inhibit movement of the first handle except from pressure by the pipe during cutting or by a biasing force to a neutral position when the first and second handles are moved together during pipe cutting or when closed during ring or sleeve compression or cutting.

8. The tool of claim 2, further comprising a cutting blade configured to cut pipe, wherein the cutting blade is pivotally and rotationally connected by a first pin to one of the first collar portions that is positioned in the second jaw and with a second pin at a distal end of the cutting blade that is configured to rest in a pin holding location that is provided as part of one of the second collar portions that is removably affixed to the first jaw member, wherein when a pipe is placed in the second collar portion and when the first and second jaw members are in the open position, the first and second handles and the first and second jaws are subsequently closed, the second pin in the cutting blade is moved into the holding location on the second collar position and the first pin is pushed by the first collar portion to push the cutting blade through the pipe while the first and second handles are moved to the closed position to thereby cut the pipe.

9. The tool of claim 1, wherein the law holders comprise respective jaw pins on the first and second jaw members, wherein when the first and second collar portions rotationally slide inside the jaw tabs such that the collar tabs are slidably received next to the sides of each of the first and second jaw members, the first and second collar portions engage the respective jaw pins to thereby hold the first and second collar portions axially, rotationally and radially in a compressing position in the first and second jaw members, respectively.

10. The tool of claim 9, wherein a portion of the jaw pins, jaw tabs and/or first and second collar portions are magnetic such that the jaw pins and/or jaw tabs magnetically engage the first and second collar portions.

11. The tool of claim 9, wherein the collar tabs are configured to engage the jaw pins and wherein a latch affixed to the tool is configured to move to hold the first and second collar portions axially in the first and second jaw members, respectively so that the first and second collar portions maintain a position on a ring or sleeve throughout compression.

12. The tool of claim 9, wherein apertures on an outside circumference of the first and second collar portions mate with a corresponding pin and/or ball plunger on an inside radius of the corresponding first and second jaw members to hold the first and second collar portions axially in the first and second jaw members, respectively, so that the first and second collar portions maintain a position on a ring or sleeve throughout compression.

13. The tool of claim 9, wherein the jaw pins are magnetic such that the jaw pins engage the first and second collar portions magnetically.

14. The tool of claim 1, wherein the first and second jaw members comprises respective tips that are configured to clamp rings or sleeves of different sizes having clamping ears that reduce a compression ring or sleeve circumference, and wherein the tips are configured to break a ring or sleeve clamp and remove a ring or sleeve from a pipe connection by grasping a ring or sleeve clamped surface and twisting to break the ring or sleeve clamp.

15. The tool of claim 1, further comprising a collar storage holder, wherein the collar tab slots are configured to be received on a first cooperating holding member on the holder such that a slotted tab end contacting another holding member on the holder and the collar tabs being further held by a strap member rotated into position at the a collar tab surface opposite the tab slot.

16. The tool of claim 1, further comprising a cutting edge and holding ends configured to cut compressed rings to be removed from pipe connections, wherein the cutting edge is configured to be removably affixed in one of the first or second jaws and/or one of the plurality of collars in the jaws and wherein when a compressed ring on a pipe is positioned within the first and second jaws and the first and second handles are moved to a closed position, the cutting edge is moved against the ring to thereby cut the ring in a substantially radial orientation.

17. The tool of claim 1, further comprising a "go no-go" gauge removably attached to the tool, wherein the "go no-go" gauge comprises an opening having a plurality of inner diameters accessed by a single opening and configured to measure corresponding diameters of compressed rings or sleeves for different pipe size connections.

18. A compression tool comprising:
a first jaw member;
a second jaw member pivotally connected to the first jaw member at a first pivot location;
a first handle connected to the second jaw member;
a second handle connected to the first jaw member;
wherein the first and second jaws are configured to move between an open position and a closed position to thereby connect flexible pipe by compressing flexible pipe connecting rings or sleeves;
a plurality of collars having two or more associated circumferences for compressing of different sizes and different types of rings or sleeves, each of the plurality of collars comprising a first collar portion that is removably attached to the first jaw member and a second collar portion that is removably attached to the second jaw member, wherein movement of the first and second jaw members, together with attached collar portions, between the open position and the closed position around a pipe connecting ring or sleeve reduces a circumference of the pipe connecting ring or sleeve thereby providing a pipe connection seal, and wherein the closure of a single hand around both the first and second handles closes the first and second jaws and collar portions to reduce the original ring or sleeve circumference to a circumference providing a flexible pipe connection seal;
a first link pivotally connected to the second jaw member at a second pivot location;
a second link pivotally connected to the first link at a third pivot location and pivotally connected to the first jaw member at a fourth pivot location;
wherein the first handle is a moving handle attached to the third pivot location, the second handle is a fixed handle rigidly connected to the first jaw member, the first jaw member is a fixed jaw member and the second jaw member is a moving jaw member that is configured to move together with the first handle;
a third link pivotally connected to the first handle at a fifth pivot location and pivotally connected at an opposite second end thereof to the first jaw member at a sixth fixed pivot location;
a first biasing member configured to bias the third link so as to move the first handle and the second handle and the first jaw and the second jaw toward the closed position;
wherein, closing the first handle toward the second handle drives the first and second links through the third pivot location to rotate the second jaw member about the first pivot location in a first rotational direction, to rotate the first link in the first rotational direction, to rotate the second link in a second, opposite, rotational direction, and to rotate the third link in the first rotational direction about the sixth pivot location, to thereby move the first and second jaw members to the closed position;

wherein the jaws are configured to be opened to accept rings or sleeves for compression by pulling the first moving handle back away translationally from the first pivot location and rotationally about the third and fifth pivot locations; and wherein the first moving handle is configured to maintain the first and second jaw members in the open position, the closed position and one or more intermediate positions between the open position and the closed position;

a first cam at the fourth pivot location that is configured to change force exerted for ring or sleeve compression by translating the first and second links away from the pivot location to further close the first and second jaw members, wherein the cam may be rotated manually with a lever portion at the fourth pivot location and permits a plurality of movements of the first and second handles with corresponding progressive jaw closures to a final cam position at a final ring or sleeve compression position, wherein the manually selected cam position is configured before ring or sleeve compression to locate the first and second handles to an open position selected for an operator's desired hand position.

19. The tool of claim 18, further comprising a movable catch, ball plunger, or friction stop member attached to the tool configured to hold the cam in a single rotational position to thereby disable free cam rotation by friction with the second link at the fourth pivot location and also thereby disable multiple positions and corresponding successive manual squeezing forces.

20. The tool of claim 18, further comprising an adjustment feature configured to compensate for wear of parts and to re-calibrate compression rings' or sleeves' compressed circumference, comprising a second cam positioned at the sixth pivot location and configured to translate the third link and the third and fifth pivot locations such that the second cam is configured to move to different positions using a rotation stop that is configured to be released by pushing the cam axially to release the stop, rotating the second cam to a different stop position, and moving the second cam in an opposite axial direction to reengage the stop, wherein the second cam is axially biased to an engaged stop position.

21. The tool of claim 18, further comprising tips on the first and second jaw members configured to clamp pipe connecting tings or sleeves that have clamping ears configured to reduce the ring or sleeve circumference such that the first cam is configured to be positioned rotationally to permit an opening of the first and second jaw members and first and second handles for beginning and completing compression of the rings or sleeves by the closure of a single hand around both the first and second handles.

22. A compression tool comprising:
a first jaw member;
a second jaw member pivotally connected to the first jaw member at a first pivot location;
a first handle connected to the second jaw member;
a second handle connected to the first jaw member;
wherein the first and second jaws are configured to move between an open position and a closed position to thereby connect flexible pipe by compressing flexible pipe connecting rings or sleeves;
a plurality of collars having two or more associated circumferences for compressing of different sizes and different types of rings or sleeves, each of the plurality of collars comprising a first collar portion that is removably attached to the first jaw member and a second collar portion that is removably attached to the second jaw member, wherein movement of the first and second jaw members, together with attached collar portions, between the open position and the closed position around a pipe connecting ring or sleeve reduces a circumference of the pipe connecting ring or sleeve thereby providing a pipe connection seal, and wherein the closure of a single hand around both the first and second handles closes the first and second jaws and collar portions to reduce the original ring or sleeve circumference to a circumference providing a flexible pipe connection seal;

a first link pivotally connected to the second jaw member at a second pivot location;

a second link pivotally connected to the first link at a third pivot location and pivotally connected to the first jaw member at a fourth pivot location;

wherein the first handle is a moving handle attached to the third pivot location, the second handle is a fixed handle rigidly connected to the first jaw member, the first jaw member is a fixed jaw member and the second jaw member is a moving jaw member that is configured to move together with the first handle;

a third link pivotally connected to the first handle at a fifth pivot location and pivotally connected at an opposite second end thereof to the first jaw member at a sixth fixed pivot location;

a first biasing member configured to bias the third link so as to move the first handle and the second handle and the first jaw and the second jaw toward the closed position;

wherein, closing the first handle toward the second handle drives the first and second links through the third pivot location to rotate the second jaw member about the first pivot location in a first rotational direction, to rotate the first link in the first rotational direction, to rotate the second link in a second, opposite, rotational direction, and to rotate the third link in the first rotational direction about the sixth pivot location, to thereby move the first and second jaw members to the closed position;

wherein the jaws are configured to be opened to accept rings or sleeves for compression by pulling the first moving handle back away translationally from the first pivot location and rotationally about the third and fifth pivot locations; and wherein the first moving handle is configured to maintain the first and second jaw members in the open position, the closed position and one or more intermediate positions between the open position and the closed position, the first and second jaws have an opening of one size to enclose the plurality of collars, and the first and second collar portions of the plurality of collars each define a different diameter and ring or sleeve contact surfaces having a width and inner radius that is sized to form flexible pipe connection seals by single-handed compression from an original ring or sleeve circumference to a final compressed ring or sleeve circumference, and ones of the plurality of collars define a center of an inner circumference thereof that is offset from a center of an inner circumference of the first and second jaw members in a direction toward the first pivot location to thereby provide mechanical advantage during ring or sleeve compression.

23. A compression tool comprising:
a first jaw member;
a second jaw member pivotally connected to the first jaw member at a first pivot location;

a first handle connected to the second jaw member;
a second handle connected to the first jaw member; wherein the first and second jaws are configured to move between an open position and a closed position to thereby connect flexible pipe by compressing flexible pipe connecting rings or sleeves;
a plurality of collars having two or more associated circumferences for compressing of different sizes and different types of rings or sleeves, each of the plurality of collars comprising a first collar portion that is removably attached to the first jaw member and a second collar portion that is removably attached to the second jaw member, wherein movement of the first and second jaw members, together with attached collar portions, between the open position and the closed position around a pipe connecting ring or sleeve reduces a circumference of the pipe connecting ring or sleeve thereby providing a pipe connection seal, and wherein the closure of a single hand around both the first and second handles closes the first and second jaws and collar portions to reduce the original ring or sleeve circumference to a circumference providing a flexible pipe connection seal;
a first link pivotally connected to the second jaw member at a second pivot location;
a second link pivotally connected to the first link at a third pivot location and pivotally connected to the first jaw member at a fourth pivot location;
wherein the first handle is a moving handle attached to the third pivot location, the second handle is a fixed handle rigidly connected to the first jaw member, the first jaw member is a fixed jaw member and the second jaw member is a moving jaw member that is configured to move together with the first handle;
a third link pivotally connected to the first handle at a fifth pivot location and pivotally connected at an opposite second end thereof to the first jaw member at a sixth fixed pivot location;
a first biasing member configured to bias the third link so as to move the first handle and the second handle and the first jaw and the second jaw toward the closed position;
wherein, closing the first handle toward the second handle drives the first and second links through the third pivot location to rotate the second jaw member about the first pivot location in a first rotational direction, to rotate the first link in the first rotational direction, to rotate the second link in a second, opposite, rotational direction, and to rotate the third link in the first rotational direction about the sixth pivot location, to thereby move the first and second jaw members to the closed position;
wherein the jaws are configured to be opened to accept rings or sleeves for compression by pulling the first moving handle back away translationally from the first pivot location and rotationally about the third and fifth pivot locations; and
wherein the first moving handle is configured to maintain the first and second jaw members in the open position, the closed position and one or more intermediate positions between the open position and the closed position
further comprising a "go no-go" gauge removably attached to the tool, wherein the "go no-go" gauge comprises an opening having a plurality of inner diameters accessed by a single opening and configured to measure corresponding diameters of compressed rings or sleeves for different pipe size connections.

\* \* \* \* \*